(12) United States Patent
Ling et al.

(10) Patent No.: US 6,581,420 B1
(45) Date of Patent: Jun. 24, 2003

(54) LOCKING APPARATUS FOR A COMPACT COMPUTER

(75) Inventors: Chong-Kuan Ling, Taipei (TW); Chun-Sheng Wu, Taipei (TW)

(73) Assignee: Sinox Co., Ltd., Taipei (TW)

( * ) Notice: Subject to any disclaimer, the term of this patent is extended or adjusted under 35 U.S.C. 154(b) by 168 days.

(21) Appl. No.: 09/776,655

(22) Filed: Feb. 2, 2001

(30) Foreign Application Priority Data

Oct. 17, 2000 (TW) .................................. 89217958 U

(51) Int. Cl.⁷ .............................................. E05B 69/00
(52) U.S. Cl. ................... 70/58; 70/14; 70/312; 248/551; 361/686
(58) Field of Search ........................... 70/14, 57, 58, 70/63, 312, 158–164; 361/683, 686; 248/551–553

(56) References Cited

U.S. PATENT DOCUMENTS

| | | | | |
|---|---|---|---|---|
| 5,007,256 A | * | 4/1991 | Lowe ............................. | 70/14 |
| 5,052,199 A | * | 10/1991 | Derman ......................... | 70/58 |
| 5,117,661 A | * | 6/1992 | Carl et al. ..................... | 70/14 |
| 5,447,045 A | * | 9/1995 | Cheng ............................ | 70/58 |
| 5,450,271 A | * | 9/1995 | Fukushima et al. .......... | 361/686 |
| 5,595,074 A | * | 1/1997 | Munro ............................ | 70/58 |
| 5,645,261 A | * | 7/1997 | Glynn ........................ | 70/58 X |
| 5,790,375 A | * | 8/1998 | Lee ............................. | 361/686 |
| 5,870,283 A | * | 2/1999 | Maeda et al. ................. | 361/686 |
| 5,933,322 A | * | 8/1999 | Ruch et al. ................... | 361/686 |
| 5,987,937 A | * | 11/1999 | Lee ................................. | 70/14 |
| 5,995,366 A | * | 11/1999 | Howell et al. ............... | 361/686 |
| 6,034,869 A | * | 3/2000 | Lin ............................. | 361/686 |
| 6,047,572 A | * | 4/2000 | Bliven et al. ................... | 70/58 |
| 6,053,017 A | * | 4/2000 | Ling .............................. | 70/58 |
| 6,095,574 A | * | 8/2000 | Dean ......................... | 70/58 X |
| 6,109,077 A | * | 8/2000 | Lee ............................ | 70/58 X |
| 6,189,349 B1 | * | 2/2001 | Helot et al. ..................... | 70/58 |
| 6,192,722 B1 | * | 2/2001 | Galant ............................ | 70/58 |
| 6,216,499 B1 | * | 4/2001 | Ronberg et al. ............... | 70/58 |
| 6,275,378 B1 | * | 8/2001 | Lee et al. .................... | 70/58 X |
| 6,298,695 B1 | * | 10/2001 | Vezina et al. ................... | 70/58 |
| 6,331,934 B1 | * | 12/2001 | Helot et al. ................. | 361/686 |
| 6,418,014 B1 | * | 7/2002 | Emerick ...................... | 361/686 |
| 6,427,499 B1 | * | 8/2002 | Derman .......................... | 70/58 |

* cited by examiner

*Primary Examiner*—Suzanne Dino Barrett
(74) *Attorney, Agent, or Firm*—Blakely Sokoloff Taylor & Zafman

(57) ABSTRACT

A locking device for a compact computer or a small computer, in particular, a personal data accessory or a palm data accessory (hereinafter referred to as PDA), is presented. The invention also includes a blocking device which is connected with the locking mechanism and is convertible between an unlocking position and a locking position, the blocking device is adapted to be locked and secured by the locking mechanism. The blocking device is adapted to be set to the locking position and resist against the incline surface of the stand so as to lock and secure the PDA with the stand.

14 Claims, 37 Drawing Sheets

LOCKING APPARATUS FOR A COMPACT COMPUTER

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to a locking apparatus for a compact computer or a small computer, in particular, a personal data accessory or a palm data accessory which is referred as PDA hereinafter. The locking apparatus is used to secure the PDA on a stand that is further connected by an electrical cable with a power supply of a desktop computer or other devices. When the PDA is placed on the stand, the PDA can be charged or electronic files can be transferred between the PDA and the desktop computer through the stand.

2. Description of the Related Art

As the fast development of the computer industry, small, compact and portable computers have become common lately. Currently, the small-sized portable PDA is very popular in the market. Generally, the PDA is utilized along with a stand, which can be connected with a desktop computer or other appropriate devices by an electrical cable. Compatible connectors are provided on both the PDA and the stand so that the PDA can be charged or electronic files can be transferred when the PDA is placed on the stand.

However, due to the small size and portability of the PDA, consumers usually worry a lot about whether the PDA will be stolen by other people when it is placed on the stand for charging or file transfer if he/her cannot be around all the time. Accordingly, it becomes necessary to provide a device which can properly secure the PDA with the stand to minimize the chances of stolen for the PDA.

BRIEF SUMMARY OF THE INVENTION

It is therefore a primary object of this invention to provide a simple locking apparatus to secure the PDA on the stand. Generally, a longitudinal extended groove is provided on both sides of the PDA, the upper end of the groove is an opening, the lower end of the groove is tapered into a closed end. The stand has a slightly upward inclined surface in the front bottom side. The locking apparatus of the invention comprises a locking mechanism; at least a protrusion which is connected with the locking mechanism and can be inserted into the groove of the PDA; and a blocking device which is connected with the locking mechanism and can be converted between an unlocking position and a locking position, or can be locked and secured by the locking mechanism. After the insertion of the projection into the groove, the blocking device can be set to the locking position to resist against the inclined surface of the stand and locked by the locking mechanism. The PDA can thus be locked and secured with the stand and will not be taken easily.

Similar manners but different detailed construction can be applied to achieve the above object. The primary concept of this invention in brief, is to provide an apparatus with one end being inserted and stuck in the groove of the PDA, while the other end of the apparatus is resisted against the stand, then the apparatus is locked and secured by a locking mechanism. Various devices currently available can be use as the locking mechanism for this invention as long as it can be used to lock the blocking device. For example, the locking devices disclosed in U.S. Pat. Nos. 4,866,959 and 5,193,367 which are incorporated herein by reference. Therefore, the specific construction of the locking mechanism-illustrated in the detailed description of this invention is for exemplary purposes and should not be used as the basis for constraining the scope o this invention.

The structures and characteristics of this invention can be realized by referring to the appended drawings and explanations of the preferred embodiments.

DETAILED DESCRIPTION OF THE INVENTION

Figure 1:
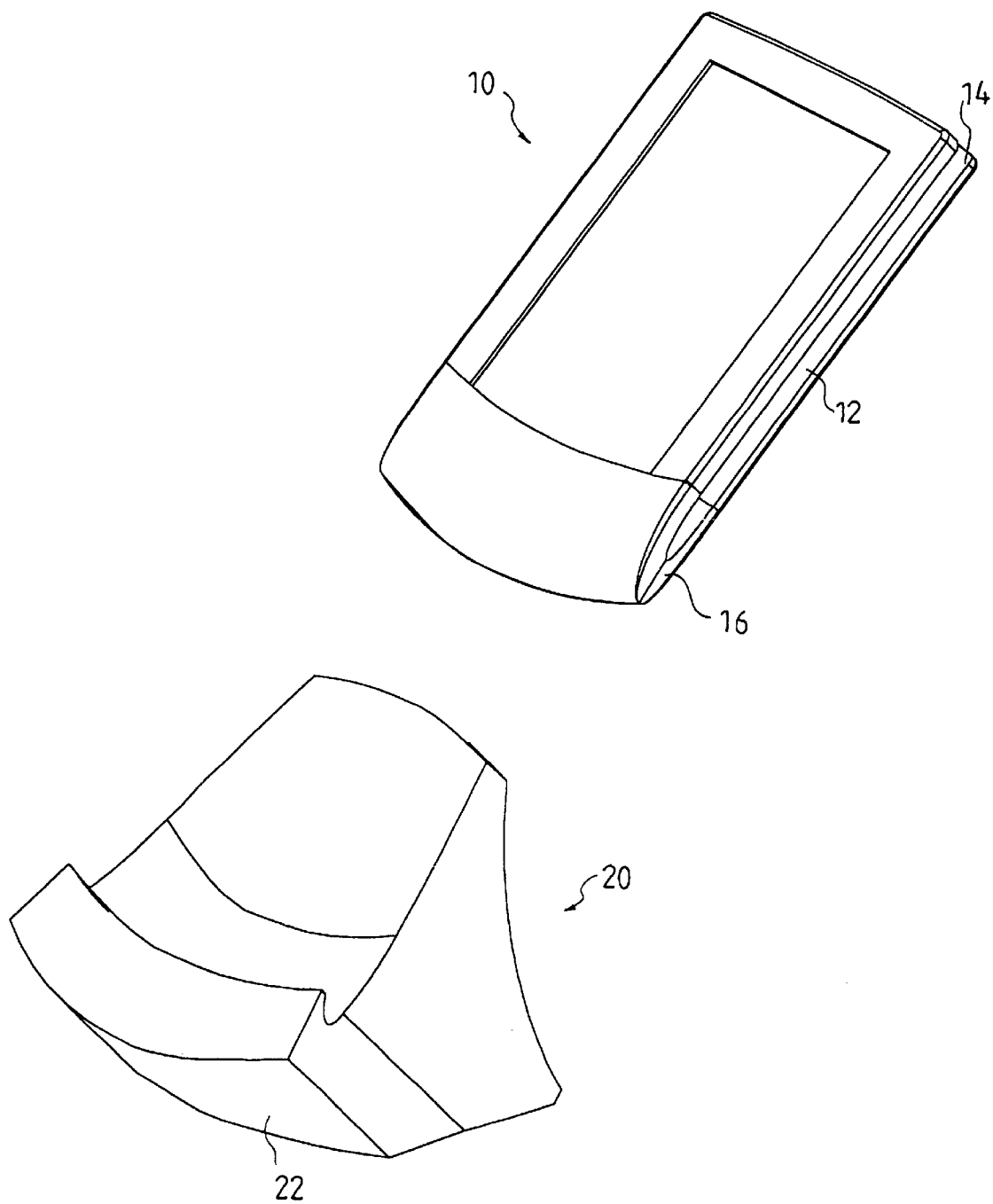
FIG. 1 is a schematic perspective view of placing the PDA on the stand.
Figure 2:
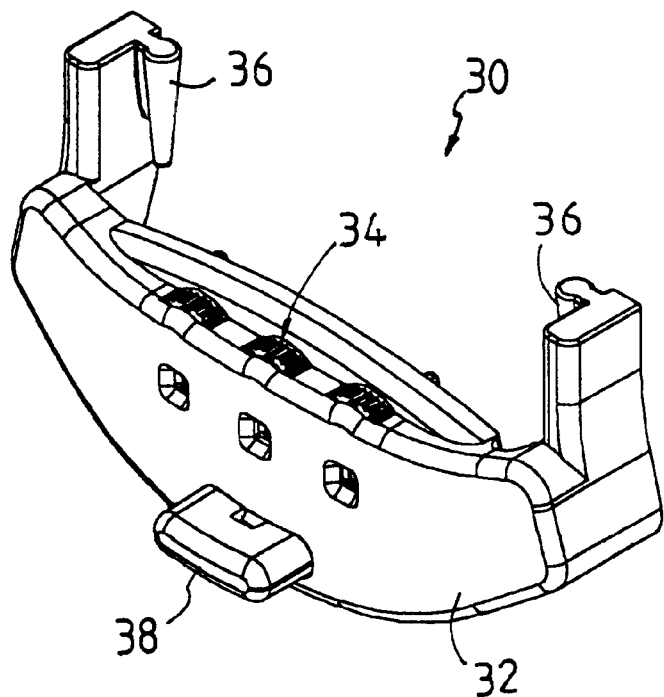
FIG. 2 is a schematic perspective view of a first preferred embodiment of the invention, wherein the button of the locking apparatus has not been pressed down.
Figure 3:
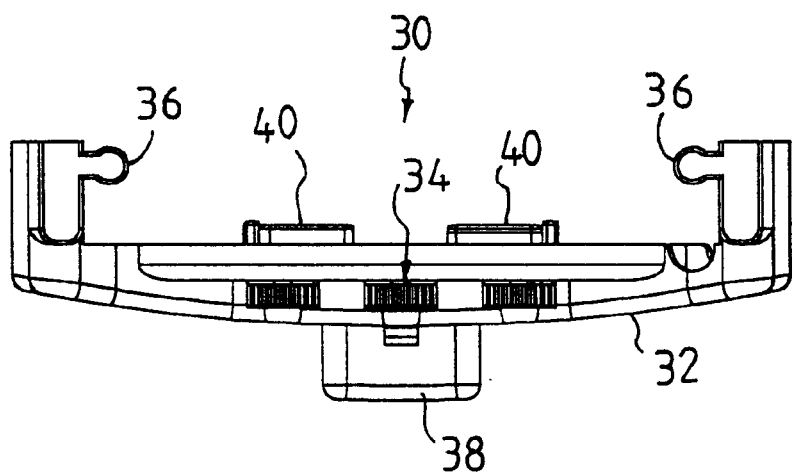
FIG. 3 is the top plan view of FIG. 2.
Figure 4:
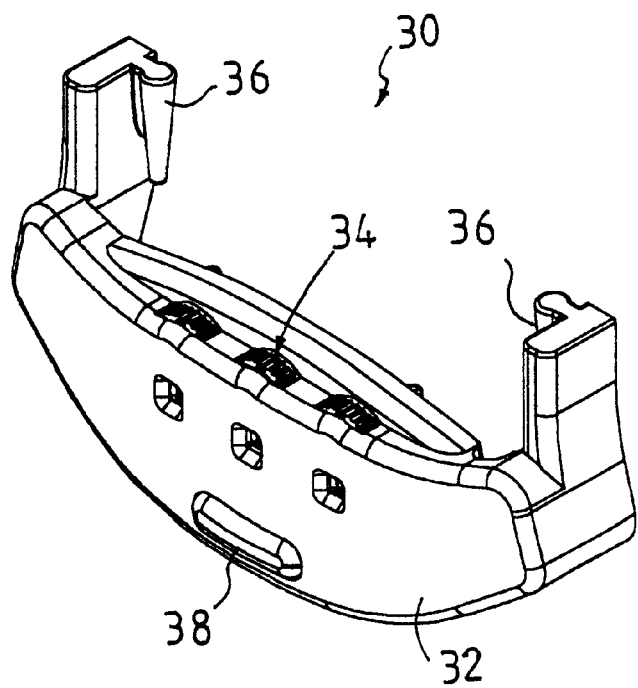
FIG. 4 is a schematic perspective view of the first preferred embodiment of the invention, wherein the button of the locking apparatus has been pressed down.
Figure 5:
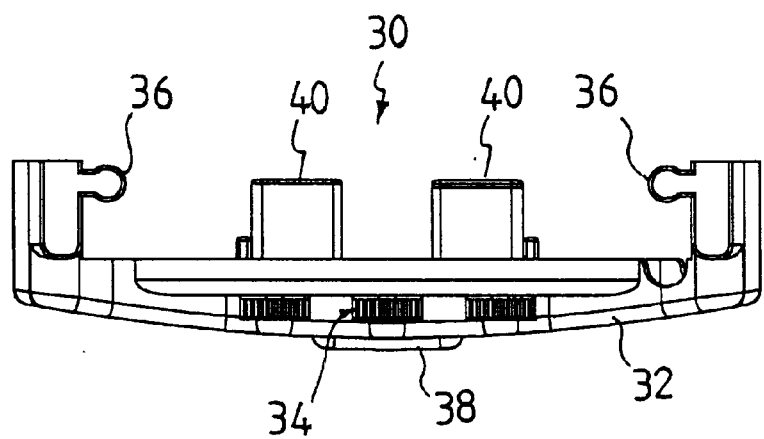
FIG. 5 is the top plan view of FIG. 4.

This invention is related to an apparatus for locking or securing a compact computer, in particular, a PDA, on a stand. Generally, as shown in FIG. 1, the PDA 10 currently available on the market is in the form of a flat rectangular parallelepiped with a slightly arcuate bottom edge. Each of the both sides of the PDA 10 is provided with a longitudinal extended groove 12. The groove 12 is an elongated channel with the side opening smaller than the inner space thereof. The groove 12 has an upper end and a lower end, the upper end is an opening 14, and the lower end is tapered into a closed end 16. When the PDA 10 is to be charged or transferred with computer files, it is placed on the stand 20, as illustrated in FIG. 1. The stand 20 has a slightly upward inclined surface 22 in the front bottom side thereof. According to a first preferred embodiment of the invention, as shown in FIGS. 2 to 5, the locking apparatus 30 for the compact computer comprises a housing 32 with a locking mechanism 34 installed therein. Each of the both sides of the housing 32 is provided with a protrusion which can be inserted into and slide within the groove 12 of the PDA 10. In the first preferred embodiment, the protrusion is a protruding post 36 with a tapered free end. The slit opening at the side of the groove 12 is smaller than the largest width of the protruding post 36. Therefore, after the protruding post 36 being inserted into the groove 12 through the opening 14, it cannot be traverse removed. A blocking device, including a button 38 and two blocks, is provided on the housing 32. The blocking device is connected with the locking mechanism 34 and can be converted between an unlocking position (as shown in FIGS. 2 and 3) and a locking position (as shown in FIGS. 4 and 5), or can be locked and secured by the locking mechanism 34.

Figure 6:
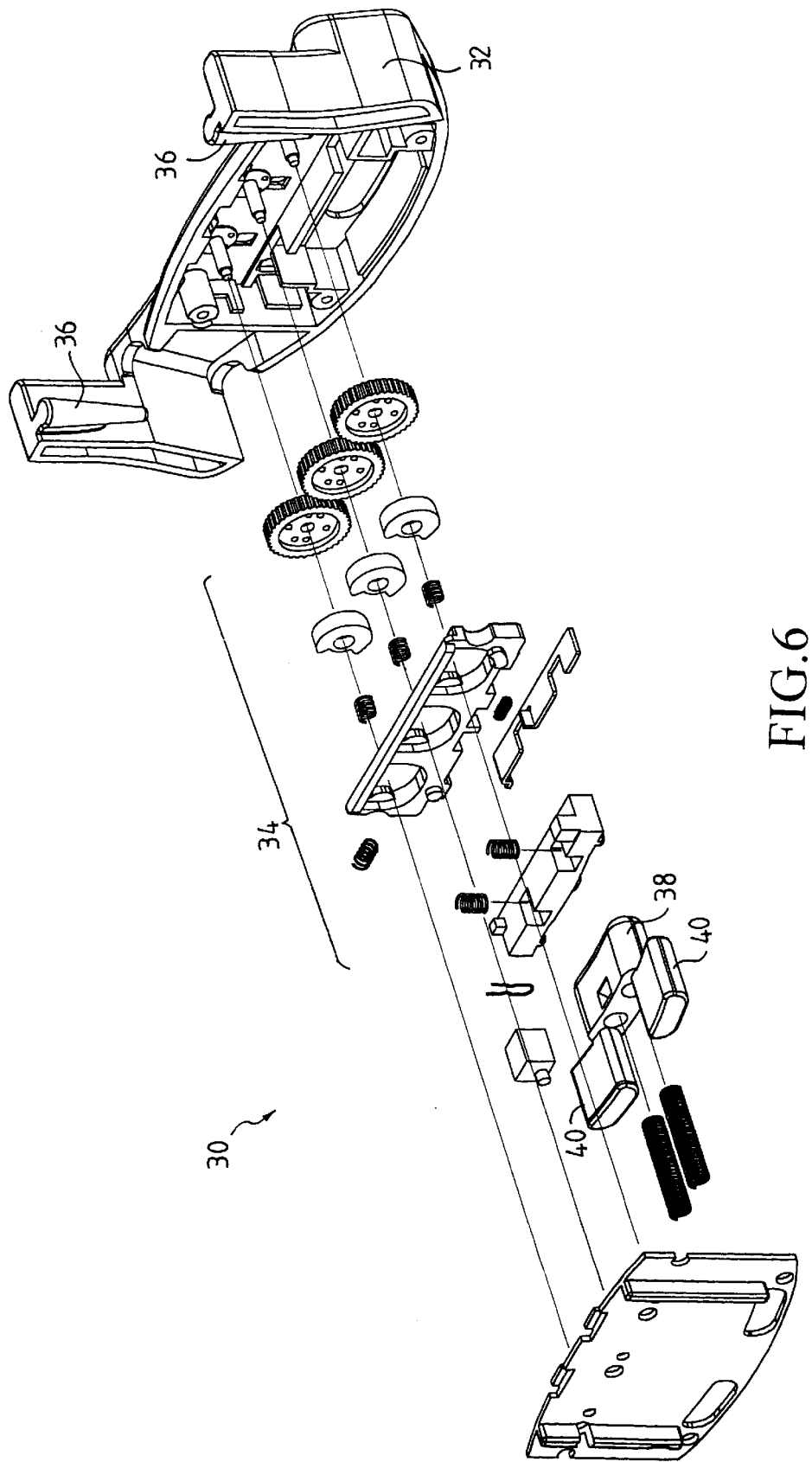
FIG. 6 is an exploded perspective view of the locking apparatus of the first preferred embodiment of the invention.
Figure 7:
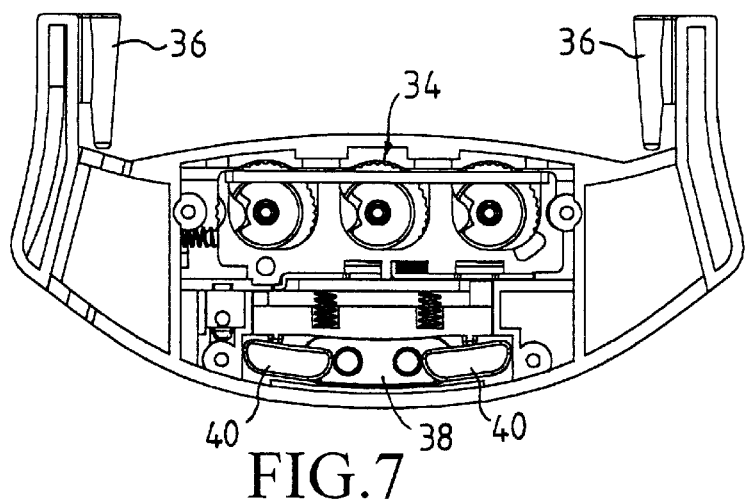
FIGS. 7 to 9 are the plan views showing the internal structures of the locking apparatus of the first preferred embodiment of the invention which illustrate the locking apparatus in unlocking condition, altering condition and locking condition respectively.
Figure 8:
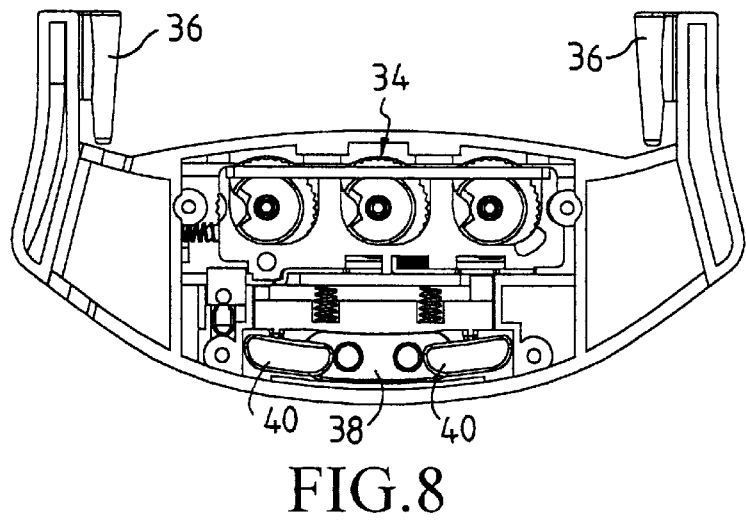
Figure 9:
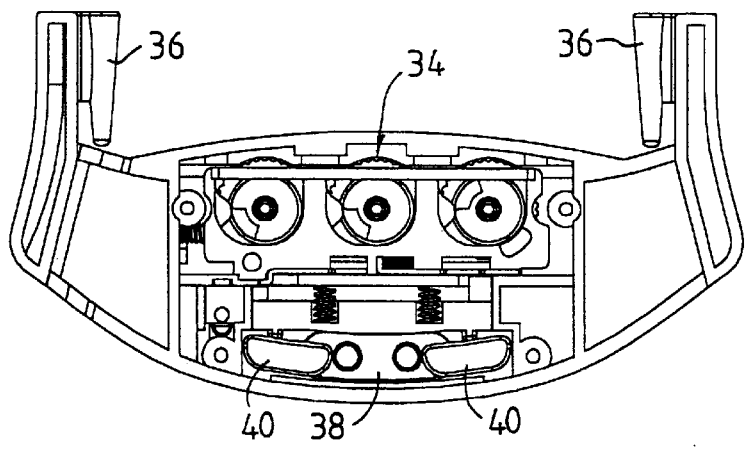
Figure 10:
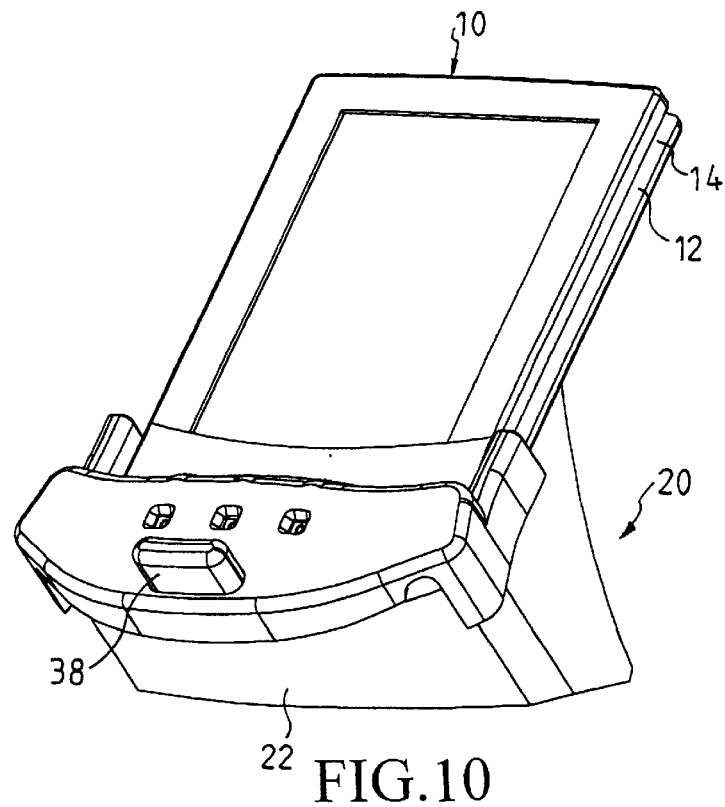
FIG. 10 is a schematic perspective view illustrating the placement of the locking apparatus of the first preferred embodiment of the invention over the PDA, wherein the button of the apparatus has not been pressed.
Figure 11:
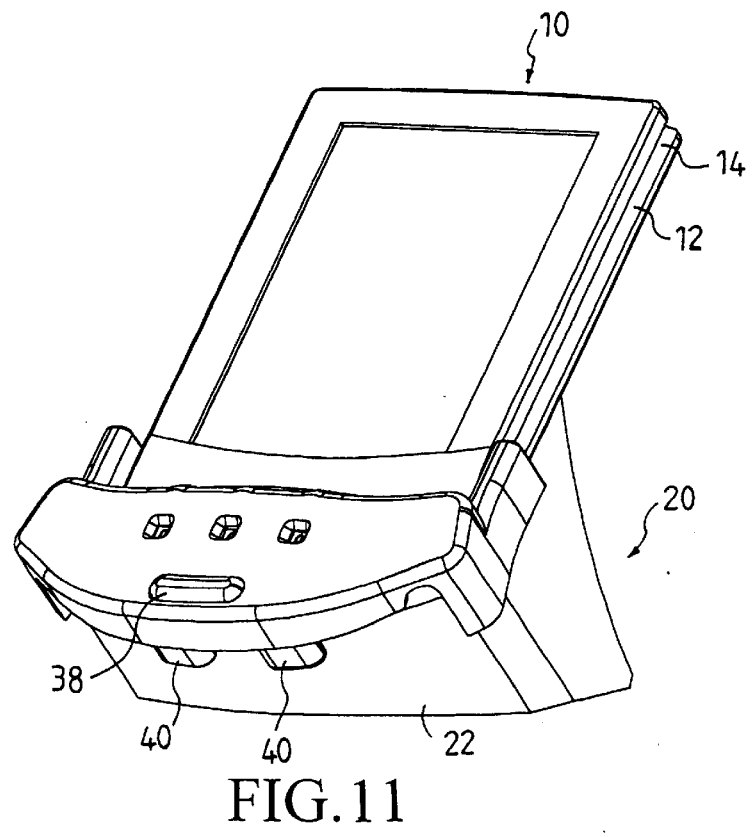
FIG. 11 is a schematic perspective view illustrating the connection of the locking apparatus of the first preferred embodiment of the invention with the PDA and the stand, wherein the button of the apparatus has been pressed.
Figure 12:
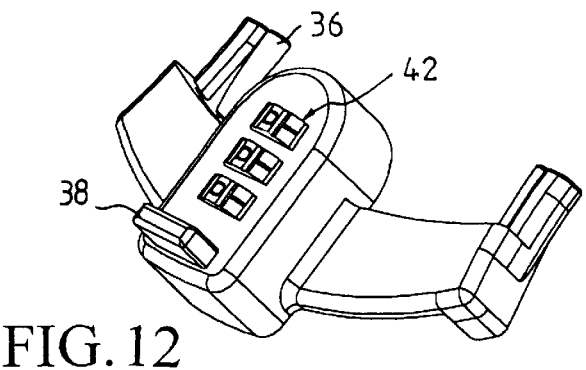
FIG. 12 is a schematic perspective view of a second preferred embodiment of the invention, wherein the button of the locking apparatus has not been pressed down.
Figure 13:
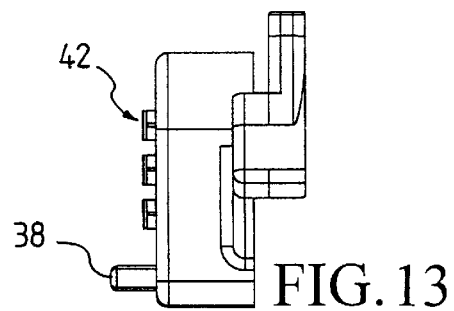
FIG. 13 is a side elevational view of FIG. 12.
Figure 14:
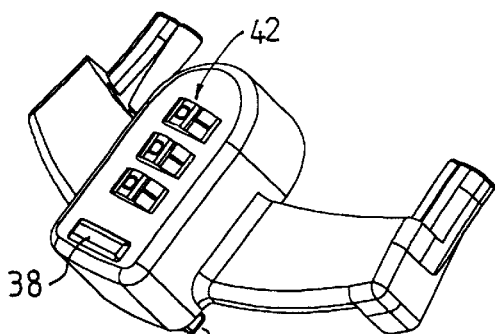
FIG. 14 is a schematic perspective view of the second preferred embodiment of the invention, wherein the button of the locking apparatus has been pressed down.
Figure 15:
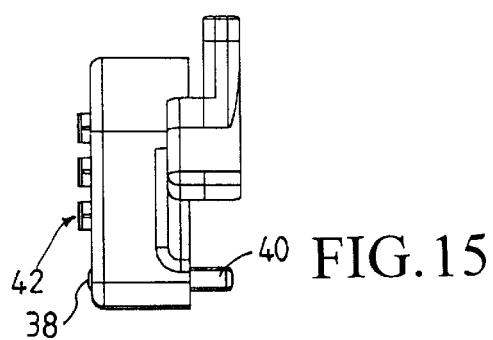
FIG. 15 is a side elevational view of FIG. 14.
Figure 16:
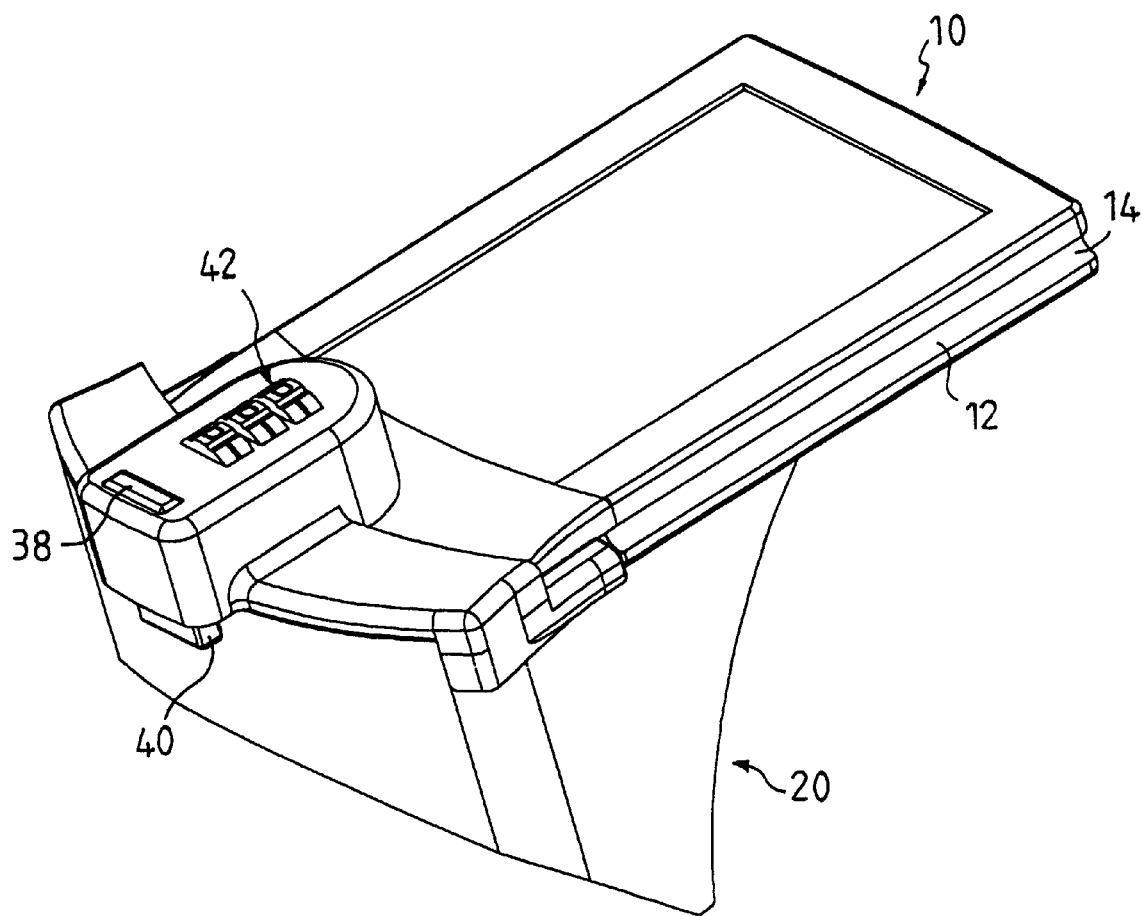
FIG. 16 is a schematic perspective view illustrating the connection of the locking apparatus of the second preferred embodiment of the invention with the PDA and the stand, wherein the button of the locking apparatus has been pressed.

The detailed construction of the locking mechanism 34 and the relationship with the button 38 and the blocks 40 can be seen from the exploded view of FIG. 6 as well as FIGS. 7 to 9. Various manners or structures can be applied for the locking mechanism 34 to achieve the identical function and the detailed construction of the locking mechanism 34 is not the major technical feature of this invention. Accordingly, detailed construction of the locking mechanism 34 and the relationship between the elements thereof are not provided herein. In the first preferred embodiment of the invention, the locking mechanism 34 is a combination lock. When the button 38 is not locked by the locking mechanism 34, the button 38 can be freely converted between a protruded position (as illustrated in FIGS. 2 and 3) and a compressed position (as illustrated in FIGS. 4 and 5). For locking and securing the PDA 10 with the stand 20, the button 38 is first set at the protruded position, the protruding post 36 is aimed with the opening 14 and then inserted into the groove 12 of the PDA 10. The protruding post 36 is slid along the groove 12 to the closed end 16 thereof, as shown in FIG. 10. The button 38 can be pressed down so that the two blocks 40 are projected to the bottom side of the stand 20, as illustrated in FIG. 11. The locking mechanism 34 can be adjusted subsequently so as to lock and secure the button 38 and the blocks 40. Since the blocks 40 are resisted against the inclined surface 22 in the front bottom side of the stand 20, the PDA 10 and the stand 20 are thus locked and secured together.

In the above preferred embodiment, various modification can be utilized for the housing 32 and the locking mechanism 34. As can be seen in the second preferred embodiment illustrated in FIGS. 12 to 16, although a different kind of locking mechanism 42 is used and there is only one block 40, the object of the invention can still be achieved.

Figure 17:
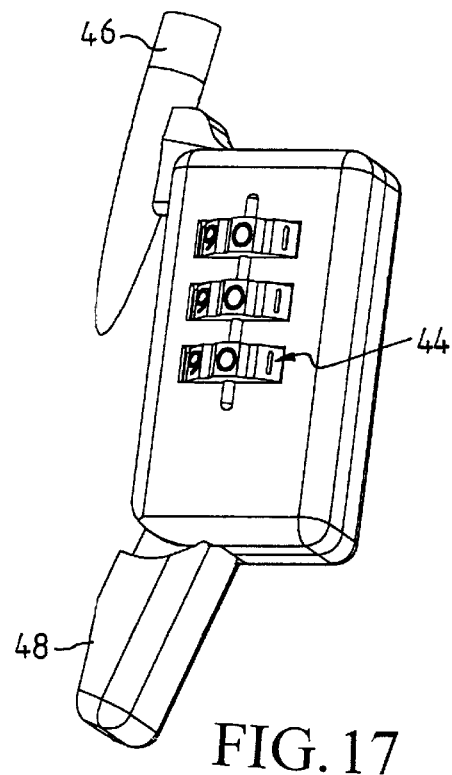
FIG. 17 is a schematic perspective view of a third preferred embodiment of the invention, wherein the block of the locking apparatus is in an unlocking position.
Figure 18:
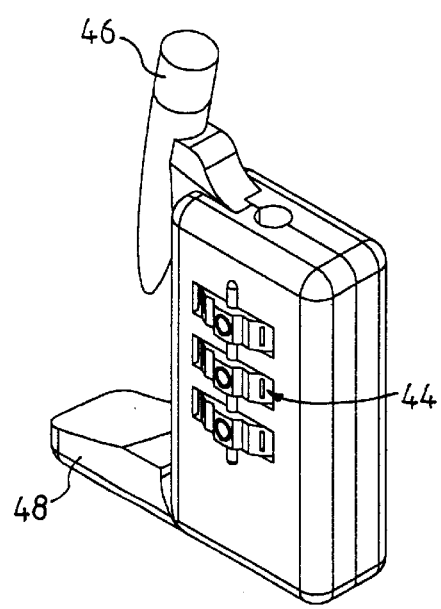
FIG. 18 is a schematic perspective view of the third preferred embodiment of the invention, wherein the block of the locking apparatus is in a locking position.
Figure 19:
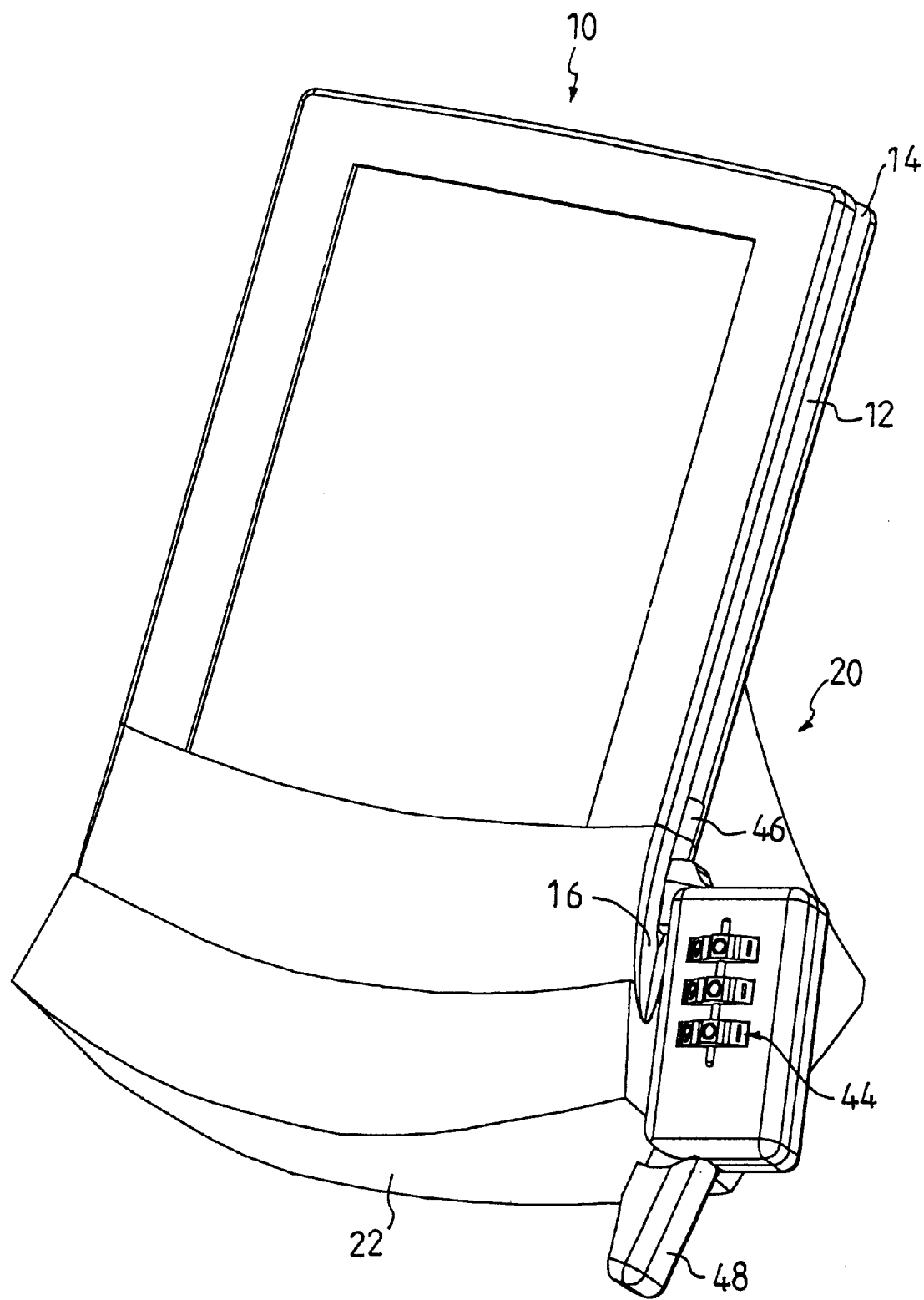
FIG. 19 is a schematic perspective view illustrating the connection of the locking apparatus of the third preferred embodiment of the invention with the PDA and the stand, wherein the block of the locking apparatus is in the unlocking position.
Figure 20:
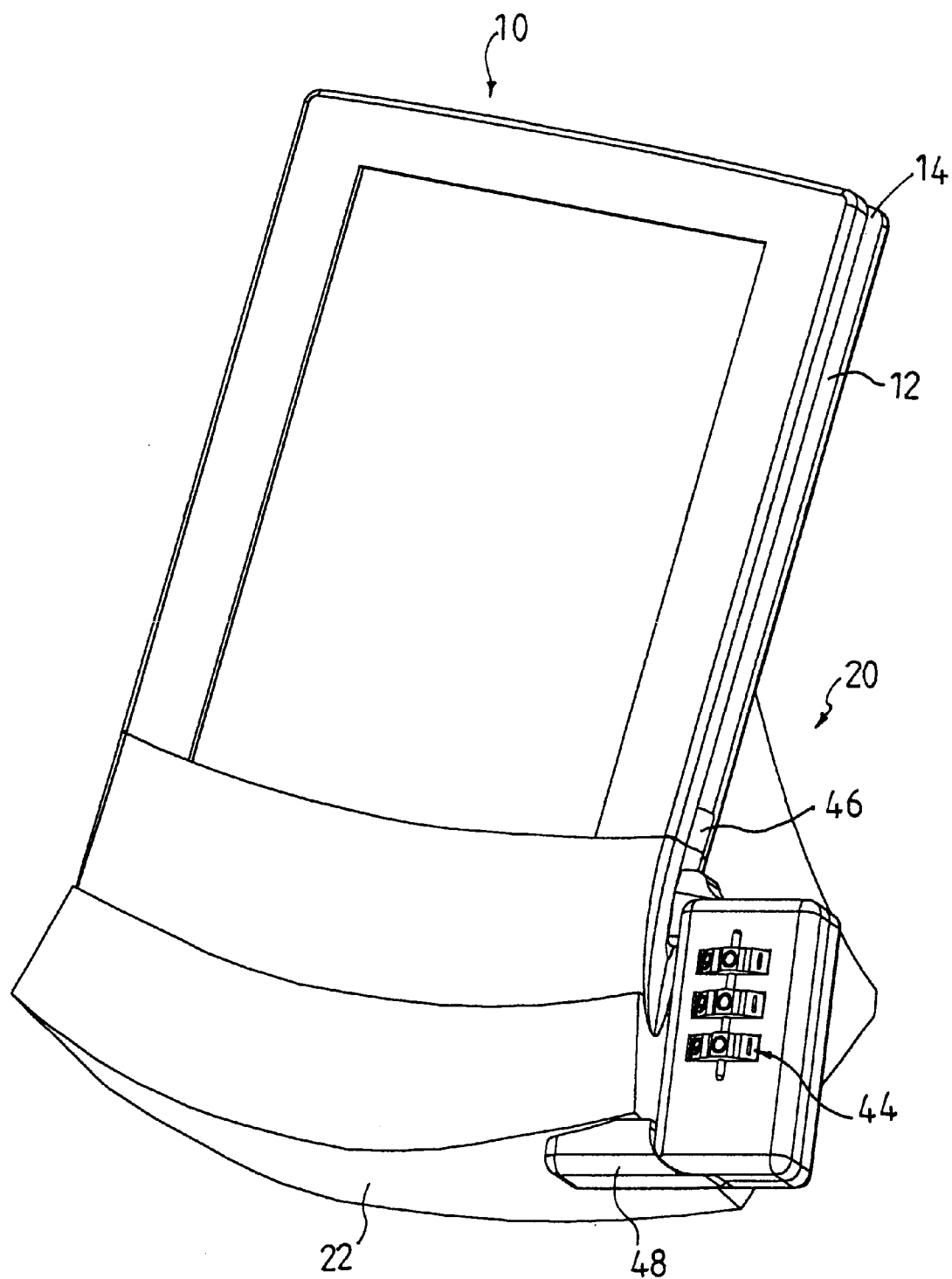
FIG. 20 is a schematic perspective view illustrating the connection of the locking apparatus of the third preferred embodiment of the invention with the PDA and the stand, wherein the block of the locking apparatus is in the locking position.

FIGS. 17 to 20 illustrate a third preferred embodiment of the invention which includes a locking mechanism 44. Detailed description of the internal structures f the locking mechanism 44 can be found in U.S. Pat. No. 5,193,367 which is incorporated herein by reference. A protruding post 46 is mounted close to a corner at the upper side of the locking mechanism 44, and a blocking device, such as a block 48, is mounted at the lower side of the locking mechanism 44. The block 48 is pivotally connected with the locking mechanism 44 and can be switched between an unlocking position (FIG. 17) and a locking position (FIG. 18). To lock and secure the PDA 10 with the stand 20, the block 48 is first set at the unlocking position as shown in FIG. 17, the protruding post 46 is aimed with the opening 14 and then inserted into the groove 12 of the PDA 10. The protruding post 46 is slid along the groove 12 to the closed end 16 thereof, as shown in FIG. 19. The block 48 an be rotated to the locking position so that it is resisted against the inclined surface 22 in the front bottom side of the stand 20, as illustrated in FIG. 20. The locking mechanism 44 can be adjusted subsequently so as to lock block 48. Since the protruding post 46 is locked within the groove 12 and the block 48 is resisted against the inclined surface 22 of the stand 20, the PDA 10 and the stand 20 are thus locked and secured together.

Figure 21:
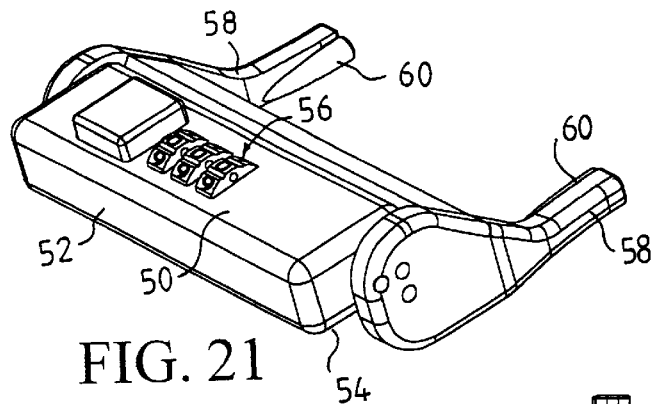
FIG. 21 is a schematic perspective view illustrating a fourth preferred embodiment of the invention, wherein the bottom side of the housing of the locking apparatus is facing downward.
Figure 22:
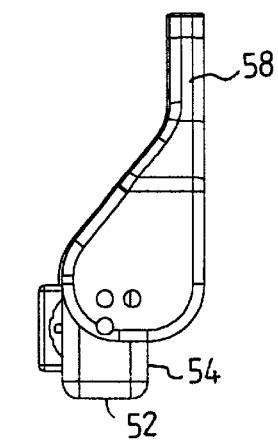
FIG. 22 is a side elevational view of FIG. 21.
Figure 23:
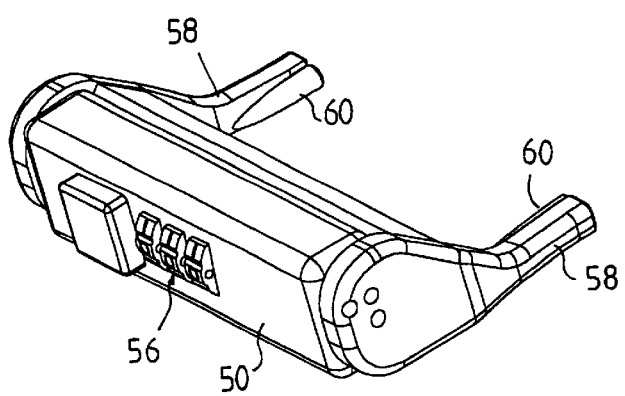
FIG. 23 is a schematic perspective view illustrating the fourth preferred embodiment of the invention, wherein the bottom side of the housing of the locking apparatus is pivotally rotated to face rearward.
Figure 24:
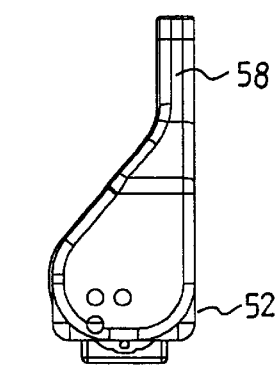
FIG. 24 is a side elevational view of FIG. 23.
Figure 25:
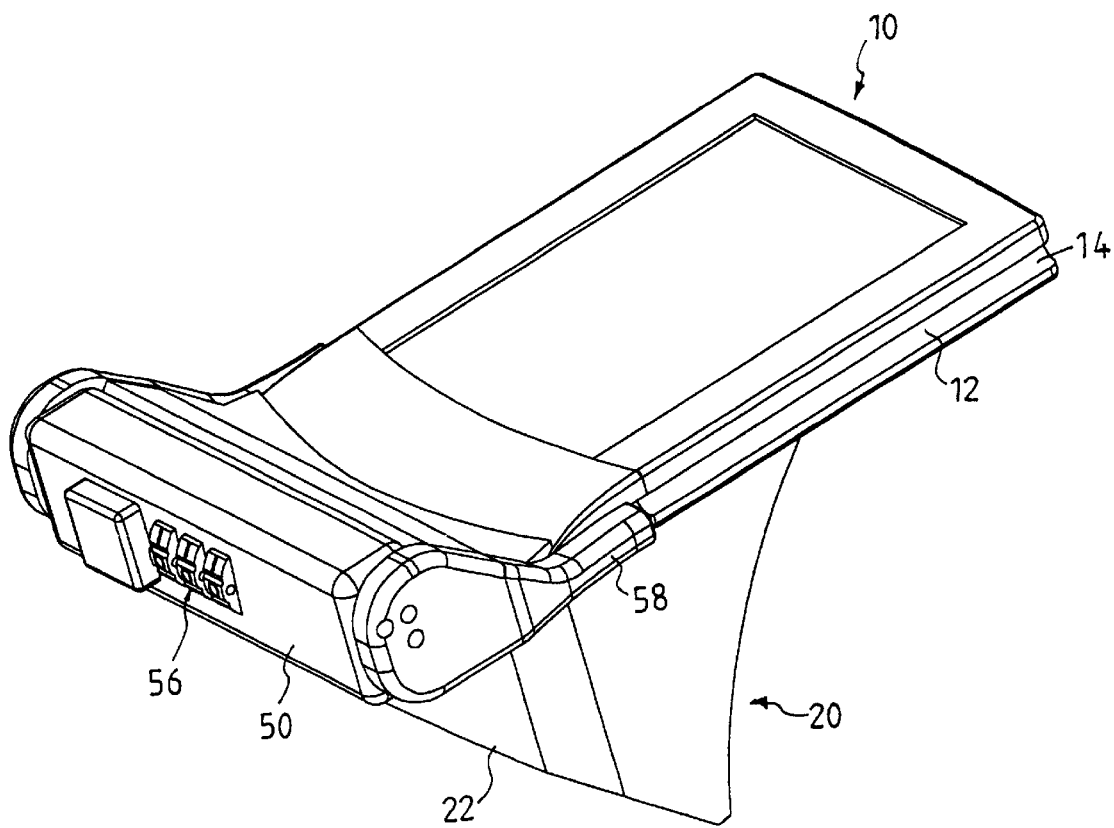
FIG. 25 is a schematic perspective view illustrating the connection of the locking apparatus of the fourth preferred embodiment of the invention with the PDA and the stand, wherein the housing of the locking apparatus is pivotally rotated to face rearward.
Figure 26:
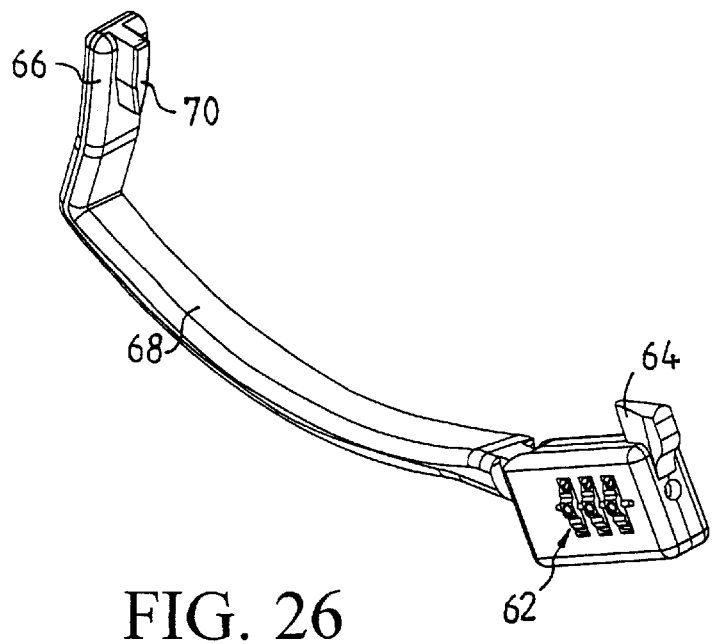
FIG. 26 is a schematic perspective view illustrating a fifth preferred embodiment of the invention, wherein the locking mechanism of the locking apparatus is in an unlocking position.
Figure 27:
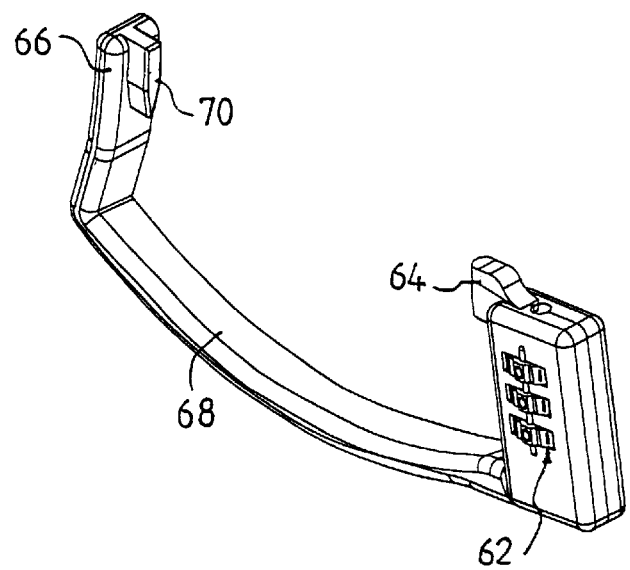
FIG. 27 is a schematic perspective view illustrating the fifth preferred embodiment of the invention, wherein the locking mechanism of the locking apparatus is in a locking position.

Referring now to FIGS. 21 to 25 is a fourth preferred embodiment of the invention, which comprises a housing 50 generally in the shape of a rectangular parallelepiped. In this preferred embodiment, the housing 50 is served as the blocking device which includes a bottom surface 52 and a rear surface 54, as shown in FIG. 22. The traverse distances of the bottom surface 52 and the rear surface 54 are approximately the same but the longitudinal distance of the rear surface 54 is larger than that of the bottom surface 52. Similar to the previous embodiments, a locking mechanism 56 is provided within the housing 50. Each of the two sides of the housing 50 is provided with an arm 58 which can be pivotally rotated, or locked with respect to the housing 50 by the locking mechanism 56. A protruding post 60 is mounted on each of the arms 58, as can be seen in FIGS. 21 and 23. To lock and secure the PDA 10 with the stand 20, the bottom surface 52 of the housing 50 is set to facing downward as shown in FIG. 22, the protruding post 60 is aimed with the opening 14 and then inserted into the groove 12 of the PDA 10. The protruding post 60 is slid along the groove 12 to the closed end 16 thereof. As shown in FIG. 25, the housing 50 is then rotated downward and rearward for about ninety degrees so that the rear surface 54 of the housing 50 is resisted against the inclined surface 22 of the stand 20. The locking mechanism 56 can be adjusted subsequently so as to lock the two arms 58 with respect to the housing 50. Since the protruding posts 60 are locked within the groove 12 and the rear surface 54 of the housing 50 is resisted against the inclined surface 22 in the front bottom side of the stand 20 and cannot be pivotally rotated with respect to the two arms 58, the PDA 10 and the stand 20 are thus locked and secured together.

Figure 28:
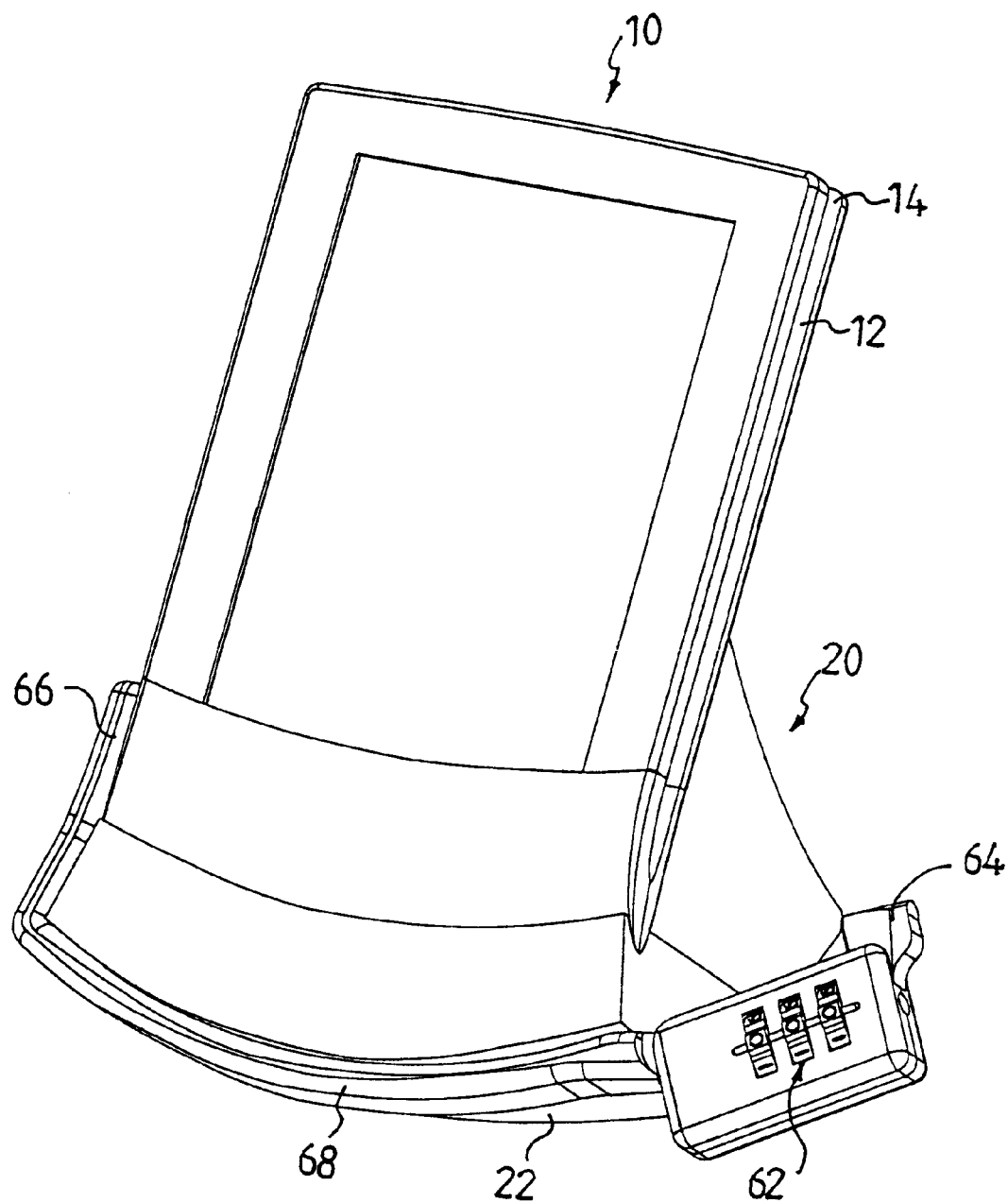
FIG. 28 is a schematic perspective view illustrating the connection of the locking apparatus of the fifth preferred embodiment of the invention with, the PDA and the stand, wherein the locking mechanism of the locking apparatus is in the unlocking position.
Figure 29:
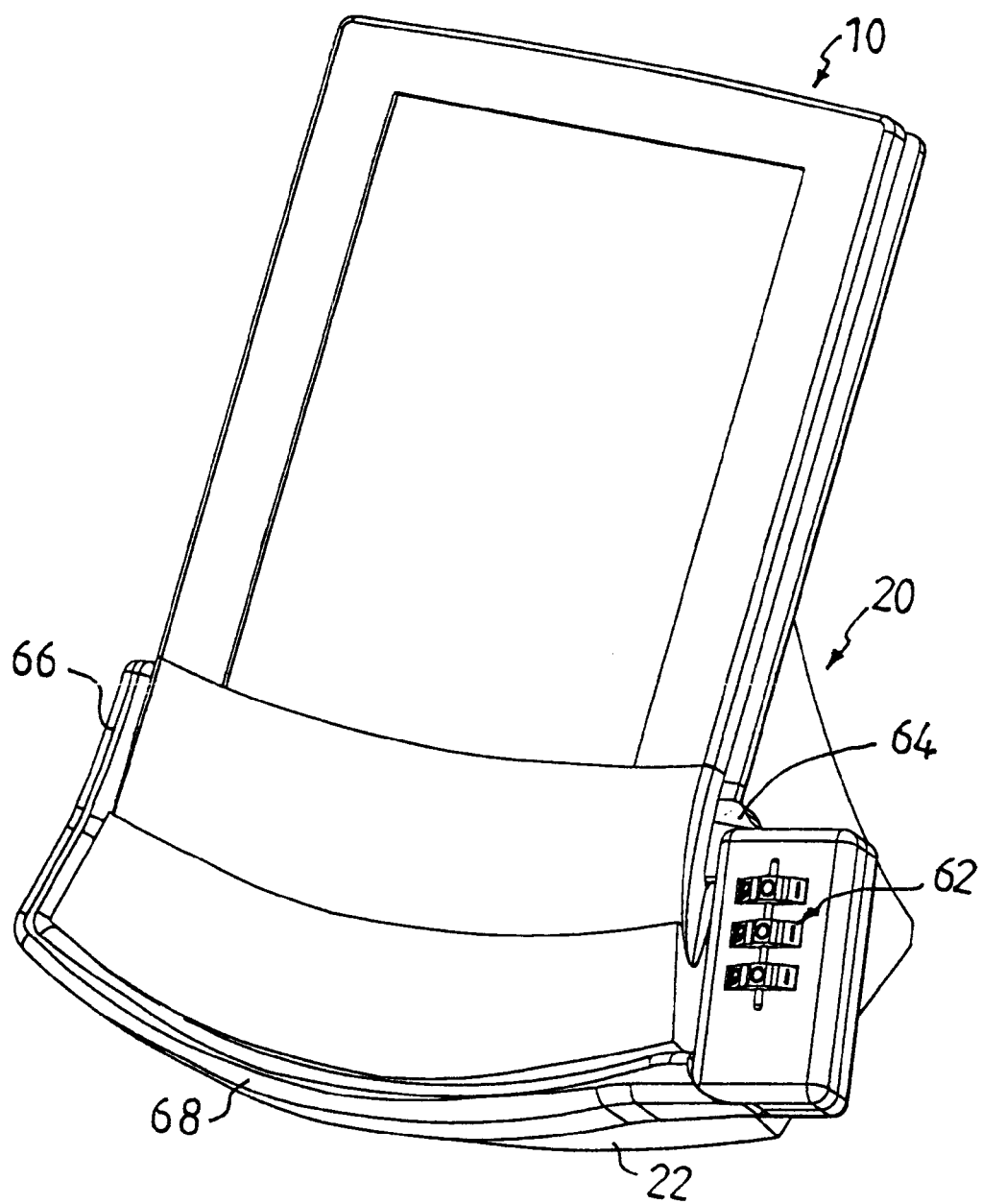
FIG. 29 is a schematic perspective view illustrating the connection of the locking apparatus of the fifth preferred embodiment of the invention with the PDA and the stand, wherein the locking mechanism of the locking apparatus is in the locking position.

FIGS. 26 to 29 illustrate a fifth preferred embodiment of the invention which also comprises a locking mechanism 62. A protruding wedge 64 is mounted close to a corner at the upper side of the locking mechanism 62, and a blocking device, such as a rod, is mounted at the lower side of the locking mechanism 62. The rod includes a main body 68 and a free end portion 66 connected therewith at a certain angle, and another protruding wedge 70 is provided on the free end portion 66 of the rod. In this preferred embodiment, the width of the protruding wedges 64 and 70 is smaller than the width of the slit opening at the side of the groove 12 of the PDA 10. Accordingly, the wedges 64 and 70 can be horizontally moved into or out of the groove 12. The main body 68 of the rod is pivotally connected with the locking mechanism 62 which thereby can be rotated with respect to the main body 68. To lock and secure the PDA 10 with the stand 20, the protruding wedge 70 on the free end portion 66 is first inserted into the groove 12 on one side of the PDA 10, as can be seen in FIG. 28. The locking mechanism 62 is then rotated so that the protruding wedge 64 thereon is inserted into the groove 12 on the other side of the PDA 10, as illustrated in FIG. 29. As a result, the main body 68 of the rod is resisted against the inclined surface 22 of the stand 20. The locking mechanism 62 can be adjusted subsequently so that the locking mechanism 62 is locked and cannot be rotated with respect to the main body 68 of the rod. Thus, the PDA 10 and the stand 20 are locked and secured together.

Figure 30:
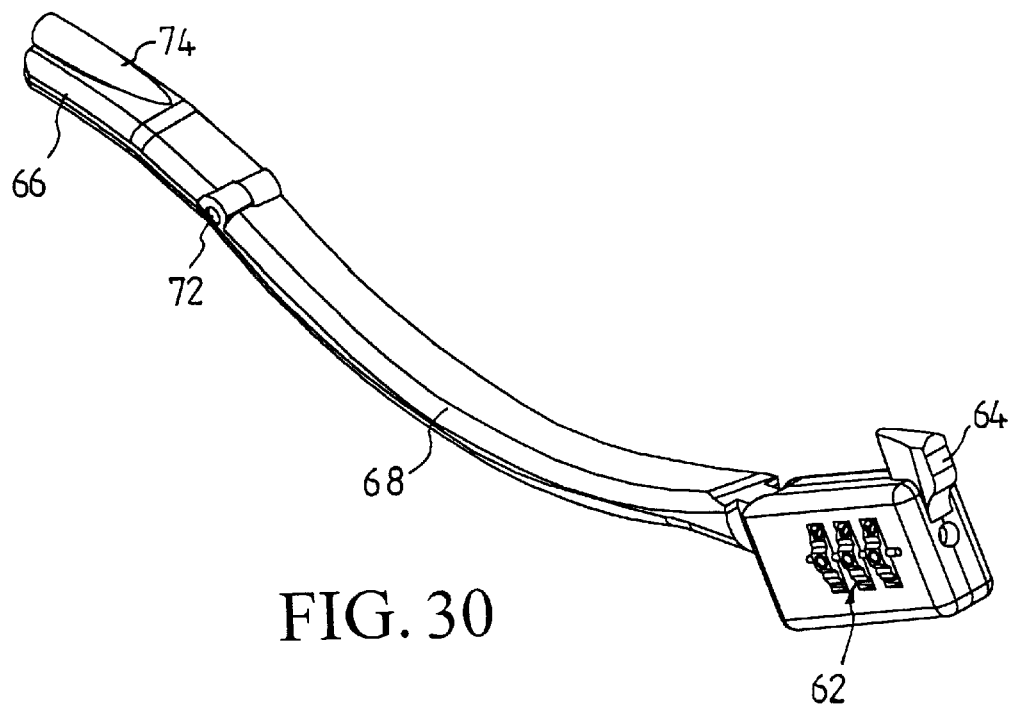
FIG. 30 is a schematic perspective view illustrating a sixth preferred embodiment of the invention, wherein the free end portion and the locking mechanism of the locking apparatus is in an unlocking position.
Figure 31:
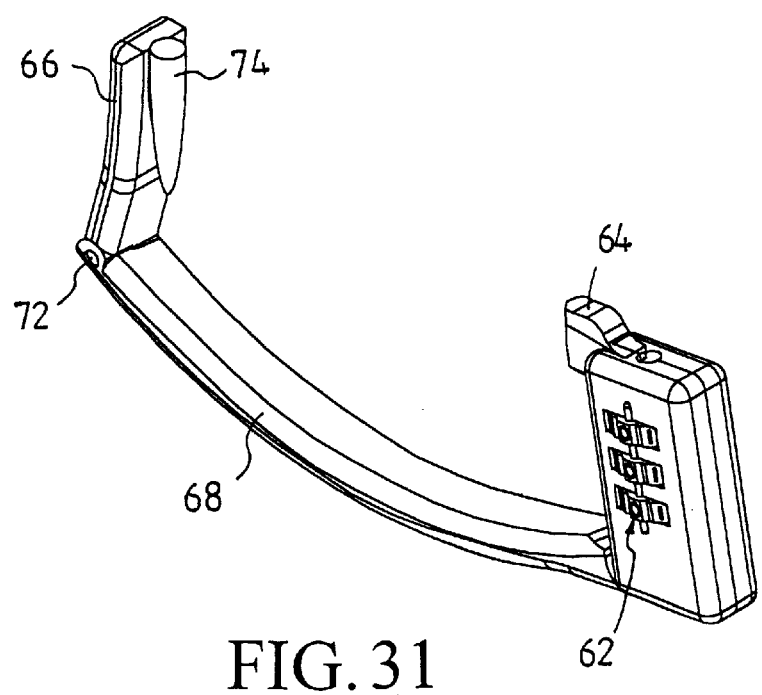
FIG. 31 is a schematic perspective view illustrating the sixth preferred embodiment of the invention, wherein the free end portion and the locking mechanism of the locking apparatus is in a locking position.
Figure 32:
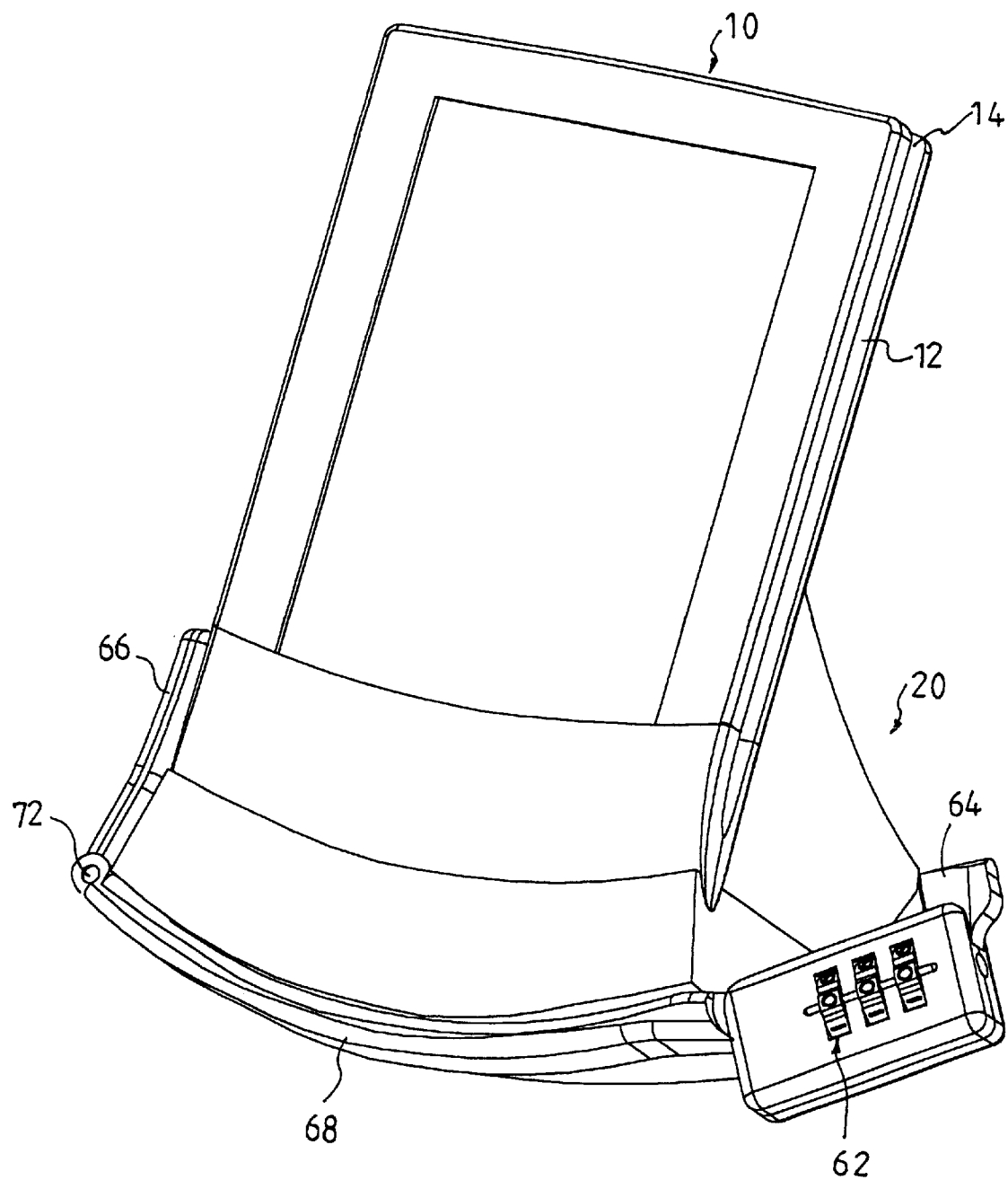
FIG. 32 is a schematic perspective view illustrating the connection of the locking apparatus of the sixth preferred embodiment of the invention with the PDA and the stand, wherein the locking mechanism of the locking apparatus is in the unlocking position.
Figure 33:
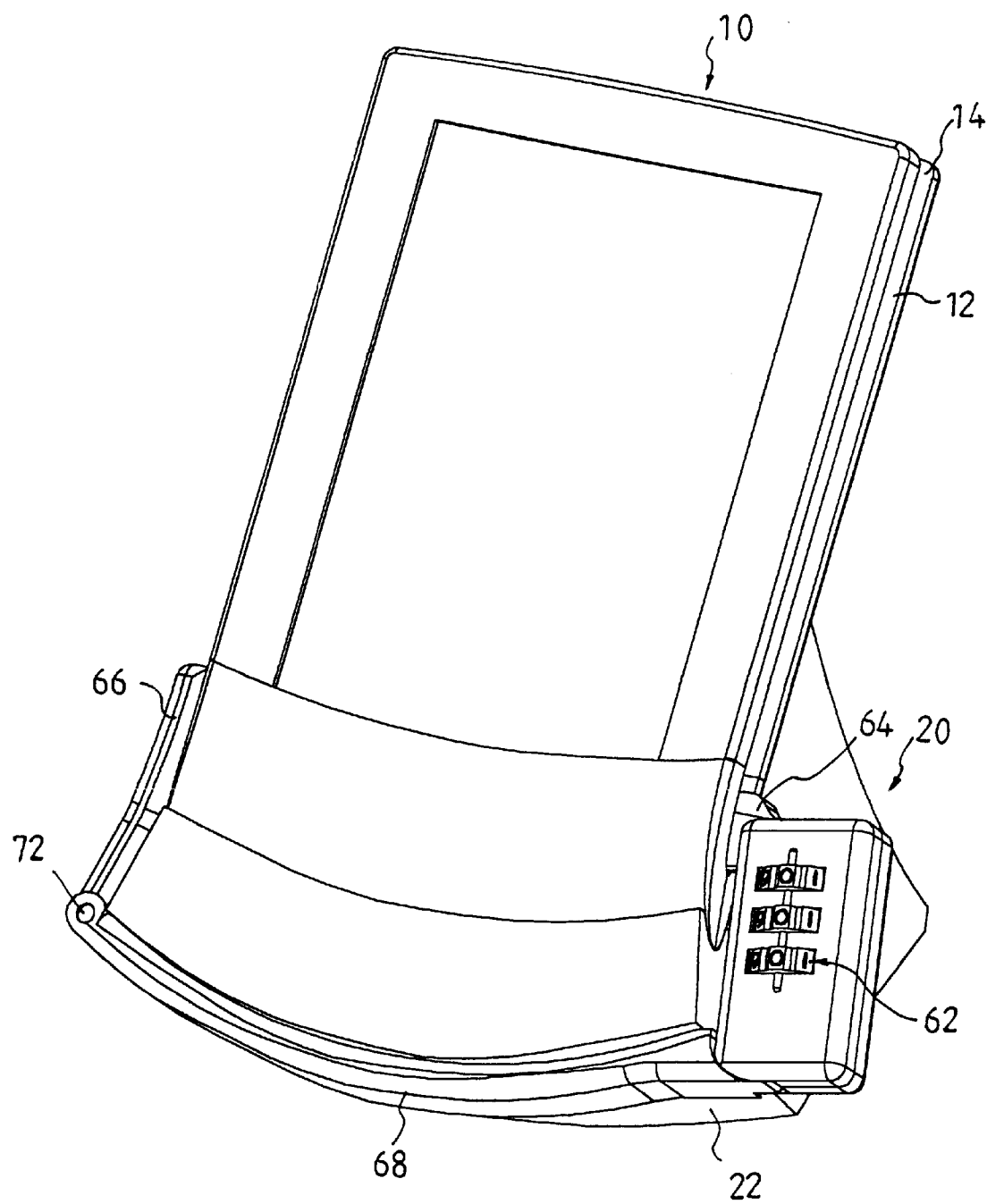
FIG. 33 is a schematic perspective view illustrating the connection of the locking apparatus of the sixth preferred embodiment of the invention with the PDA and the stand, wherein the locking mechanism of the locking apparatus is in the locking position.
Figure 34:
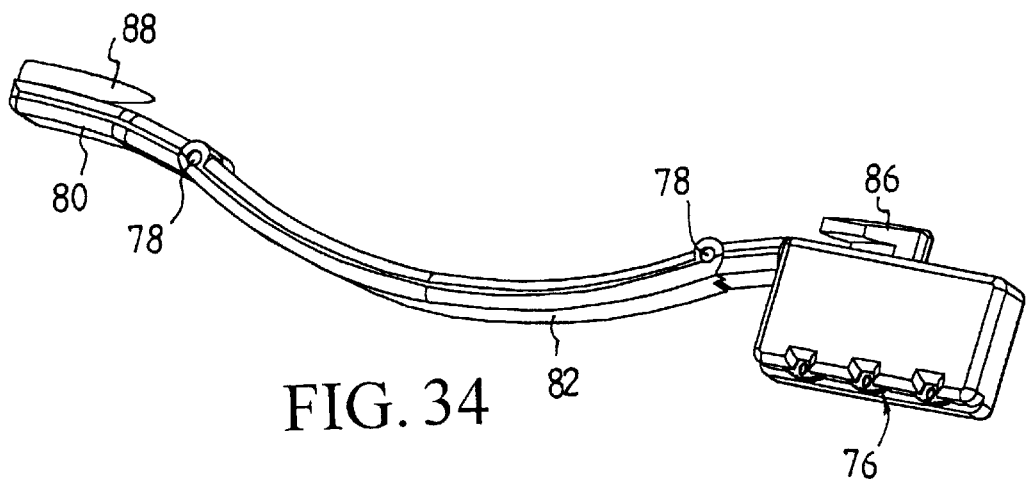
FIG. 34 is a schematic perspective view illustrating a seventh preferred embodiment of the invention, wherein the free end portion and the locking mechanism of the locking apparatus is in an unlocking position.

FIGS. 30 to 33 illustrate a sixth preferred embodiment of the invention. The difference between the sixth and the fifth embodiments resides in that a pivotal joint 72 is provided between the free end portion 66 and the main body 68 such that the free end portion 66 can be pivotally rotated with respect to the main body 68 as shown in FIGS. 30 and 31. Another difference is that the protruding wedge 70 of the fifth embodiment is replaced with a protruding post 74 which has a tapered end in the sixth embodiment, and the maximum diameter of the protruding post 74 is larger than the slit opening at the side of the groove 12 and thus the protruding post 74 cannot be traverse moved out when inserted into the groove 12. The operation procedures of the sixth preferred embodiment are very similar to those of the fifth preferred embodiment as described above.

Figure 35:
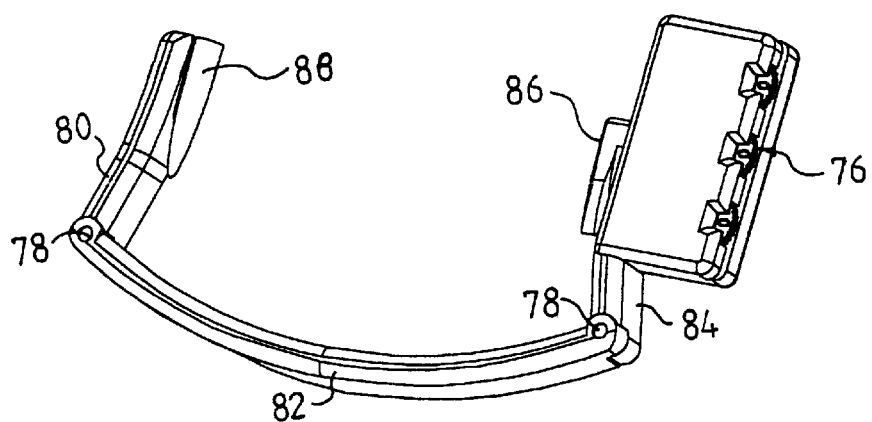
FIG. 35 is a schematic perspective view illustrating the seventh preferred embodiment of the invention, wherein the free end portion and the locking mechanism of the locking apparatus is in a locking position.
Figure 36:
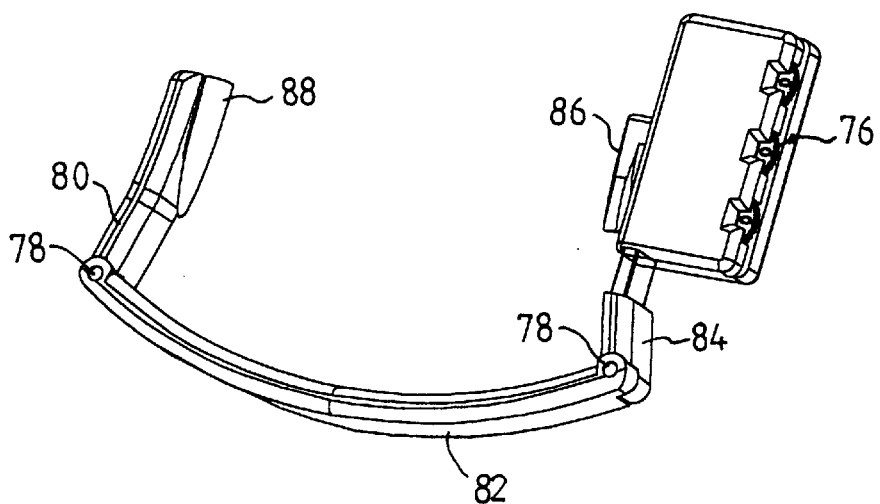
FIG. 36 is a schematic perspective view illustrating the seventh preferred embodiment of the invention, wherein the locking mechanism and the portion connected with the locking mechanism of the locking apparatus are in an extended condition.
Figure 37:
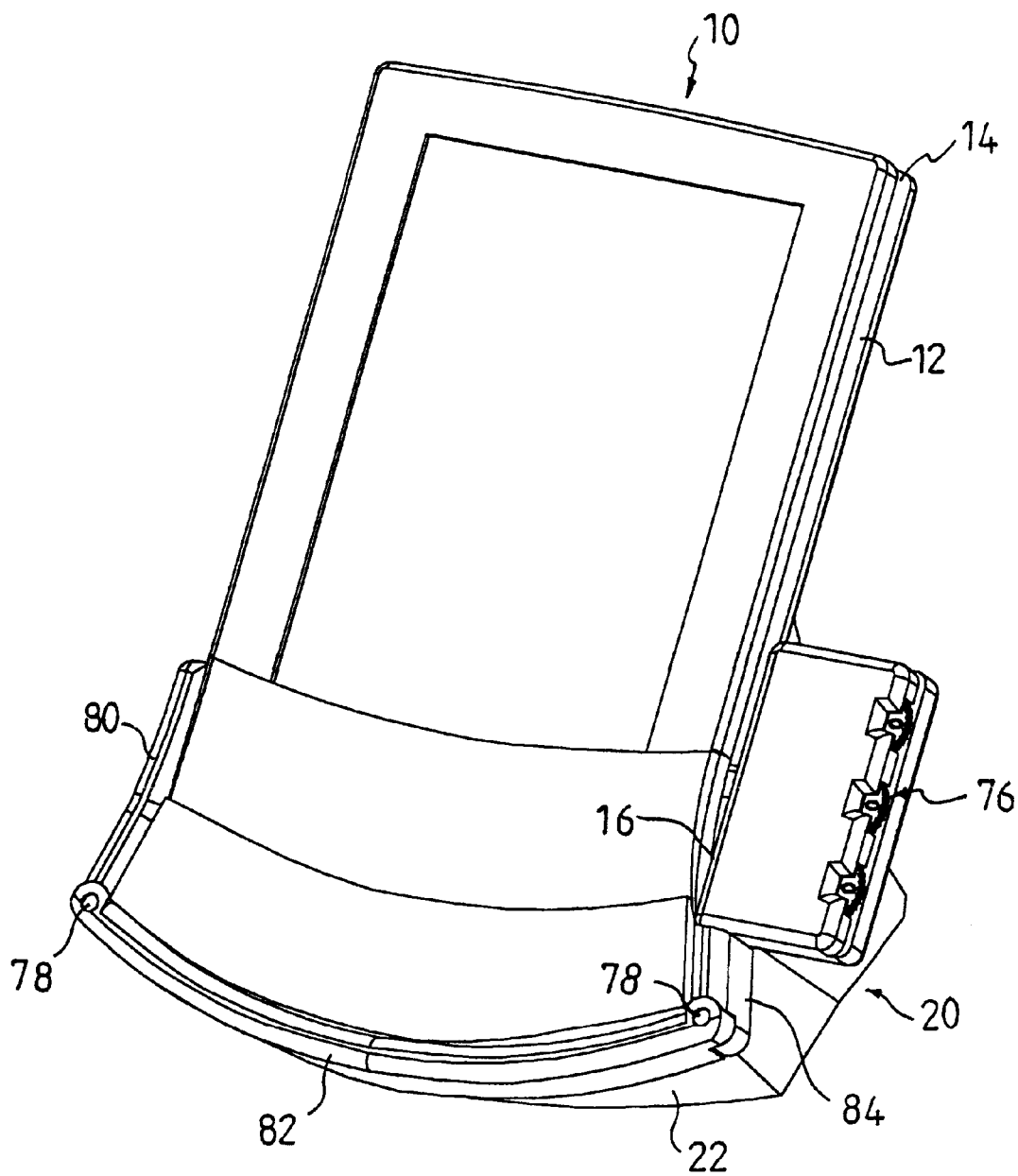
FIG. 37 is a schematic perspective view illustrating the connection of the locking apparatus of the seventh preferred embodiment of the invention with the PDA and the stand, wherein the locking mechanism of the locking apparatus is in the locking position.

FIGS. 34 to 37 are related to a seventh preferred embodiment of the invention which also comprises a locking mechanism 76. Detailed description of the internal structures of the locking mechanism 76 can be found in U.S. Pat. No. 4,866,959. This embodiment also includes a blocking device such as a rod having two pivotal joints 78 separating the rod into a free end portion 80, a main body 82, and a connecting part 84 connected with the locking mechanism 76. The free end portion 80 and the connecting part 84 can be pivotally rotated with respect to the main body 82 by the two pivotal joints 78. A protruding post 86 is provided on the locking mechanism 76 and another protruding post 88 is provided on the free end portion 80. Both the protruding posts 86 and 88 have a tapered free end to be inserted into the closed end 16 of the grooves 12 of the PDA 10. For this preferred embodiment, the locking mechanism 76 can be telescopically moved with respect to the connecting part 84 between an unlocking position (FIG. 36) and a locking position (FIG. 35). To lock and secure the PDA 10 with the stand 20, the protruding post 88 on the free end portion 80 is first inserted into the groove 12 on one side of the PDA 10 and is slid along the groove 12 to the closed end 16. The main body 82 and the connecting part 84 of the rod as well as the locking mechanism 76 are then pivotally rotated so that the protruding post 86 on the locking mechanism 76 is inserted into the groove 12 on the other side of the PDA 10. The locking mechanism 76 is next pressed down to the locking position so that the tapered free end of the protruding post 86 is inserted into the closed end 16 of the groove 12, as illustrated in FIG. 37. Consequently, the main body 82 of the rod is resisted against the inclined surface 22 of the stand 20. The locking mechanism 76 can be adjusted subsequently so that the locking mechanism 76 is locked and cannot be moved or rotated with respect to the main body 82 of the rod. Thus, the PDA 10 and the stand 20 are locked and secured together.

Figure 38:
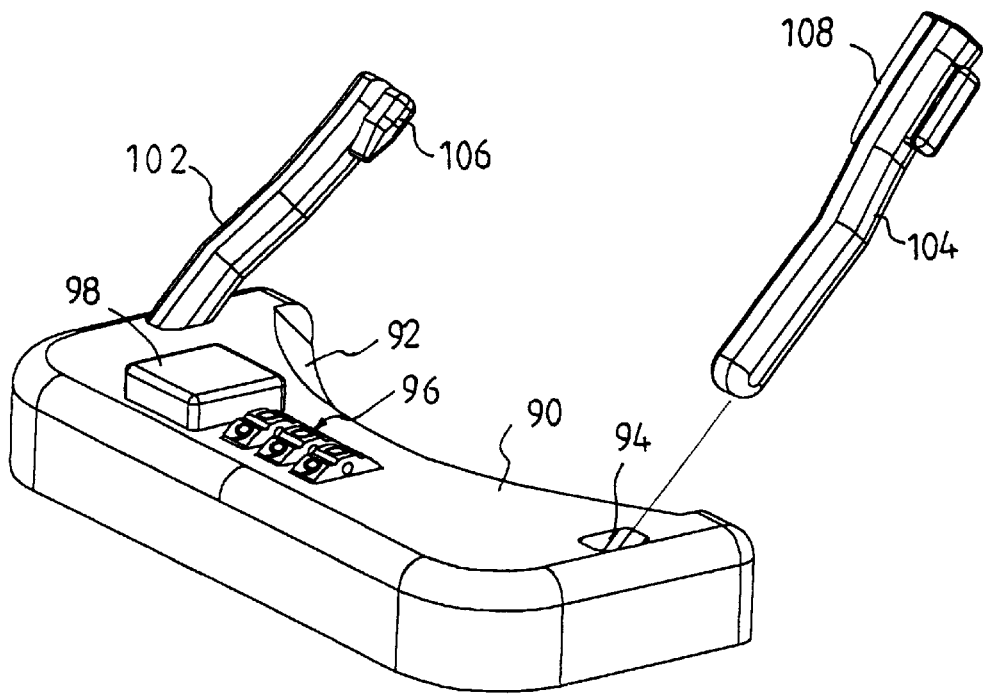
FIG. 38 is a schematic perspective view illustrating an eighth preferred embodiment of the invention, wherein one insertion rod is separated from the housing of the locking apparatus.
Figure 39:
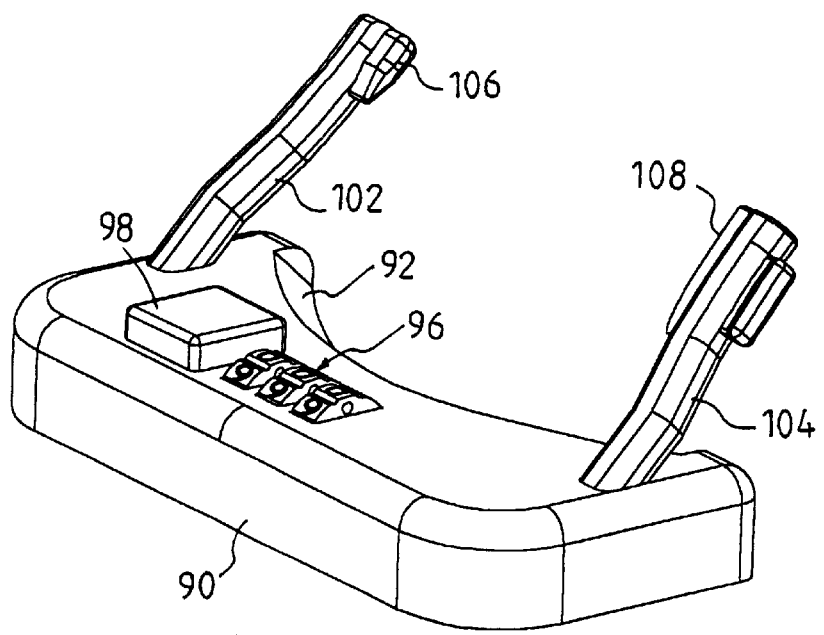
FIG. 39 is a schematic perspective view illustrating the eighth preferred embodiment of the invention, wherein the insertion is connected with the housing of the locking apparatus.
Figure 40:
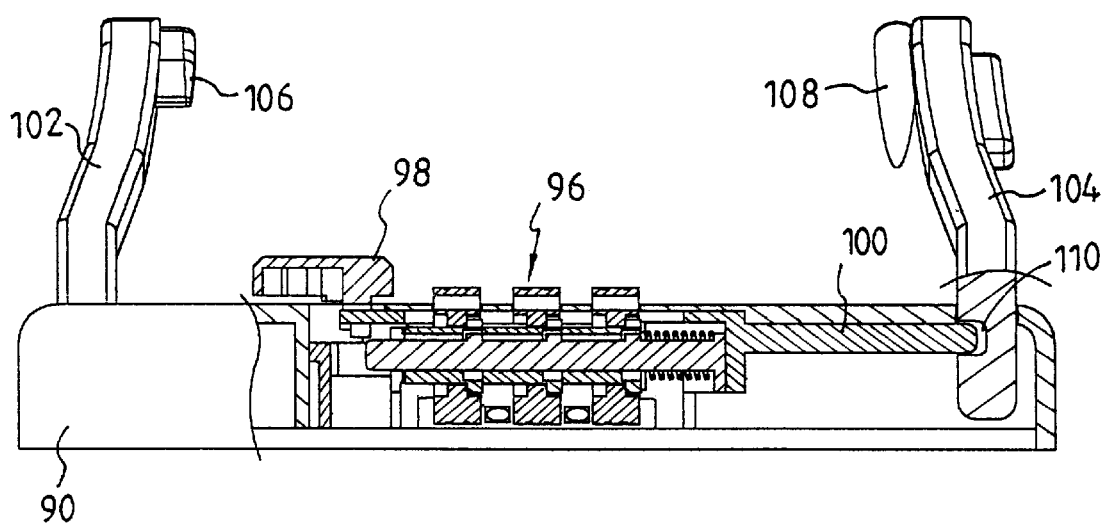
FIG. 40 is a fractional cross-section view of the eighth preferred embodiment of the invention illustrating the structure of the locking mechanism of the locking apparatus.
Figure 41:
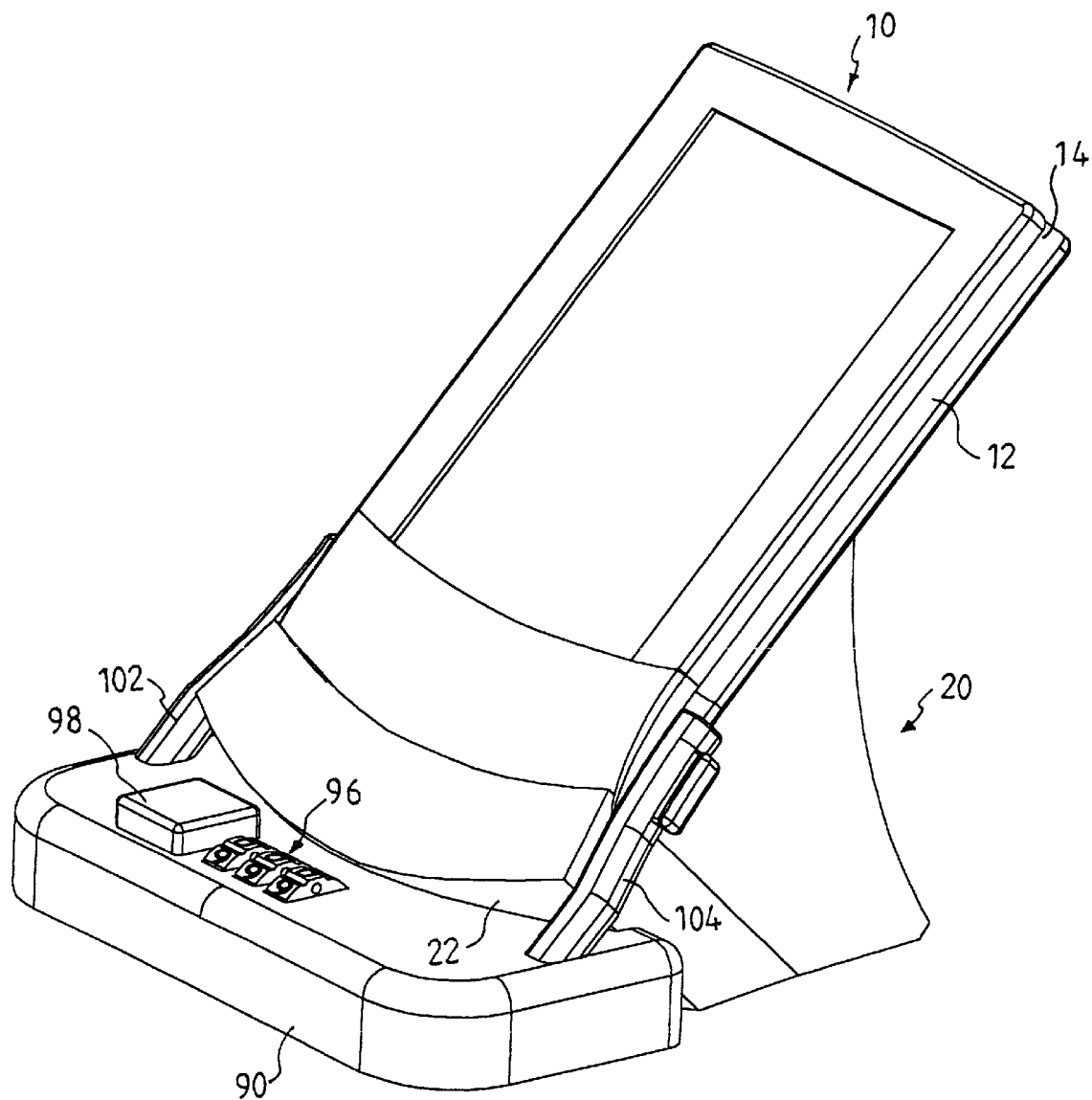
FIG. 41 is a schematic perspective view illustrating the connection of the locking apparatus of the eighth preferred embodiment of the invention with the PDA and the stand.

FIGS. 38 to 41 illustrate an eighth preferred embodiment of the invention comprising a housing 90 which is served as the blocking device of the invention. The housing 90 having a surface 92, as can be seen in FIGS. 38 and 39, which is formed to compatibly meet with the inclined surface 22 of the stand 20 as illustrated in FIG. 41. The housing 90 has insertion holes 94, a locking mechanism 96, and a button 98, as shown in FIG. 38. The locking mechanism 96 and the button 98 are connected with a latching member 100, as shown in the fractional cross-section view of FIG. 40. The latching member 100 can thus be controlled between an unlocking position and a locking position by the locking mechanism 96 and the button 98. The preferred embodiment further comprises two insertion rods 102 and 104 having a protrusion thereon respectively, such as a protruding wedge 106 and a protruding post 108 illustrated in FIGS. 38 to 40. The protruding wedge 106 and protruding post 108 can be inserted into the grooves 12 of the PDA 10. For this preferred embodiment, the insertion rod 102 with the protruding wedge 106 is fixed on the housing 90, while the other insertion rod 104 with the protruding post 108 can be separated from the housing 90. The protruding post 108 has a tapered free end. The insertion rod 104 has a depression 110, as shown in FIG. 40. Therefore, after the insertion rod 104 being inserted into the insertion hole 94 of the housing 90, the latching member 100 can be stuck into the depression 110 to lock the insertion rod 104. To lock and secure the PDA 10 with the stand 20, the housing 90 and the insertion rod 102 fixed thereon are moved to the PDA 10 and the stand 20 so that the surface 92 of the housing 90 is resisted against the inclined surface 22 of the stand 20 and the protruding wedge 106 is inserted into the groove 12 of the PDA 10. The protruding post 108 of the insertion rod 104 is thereby inserted into the groove 12 at the other side of the PDA 10 and is slid along the groove 12 such that the tapered free end of the protruding post 108 is inserted into the closed end 16 of the groove 12, as shown in FIG. 41. The locking mechanism 96 and/or the button 98 can be adjusted subsequently so that the latching member 100 is inserted into the depression 110 of the insertion rod 104 which is thereby locked. The PDA 10 and the stand 20 are thus locked and secured together.

Figure 42:
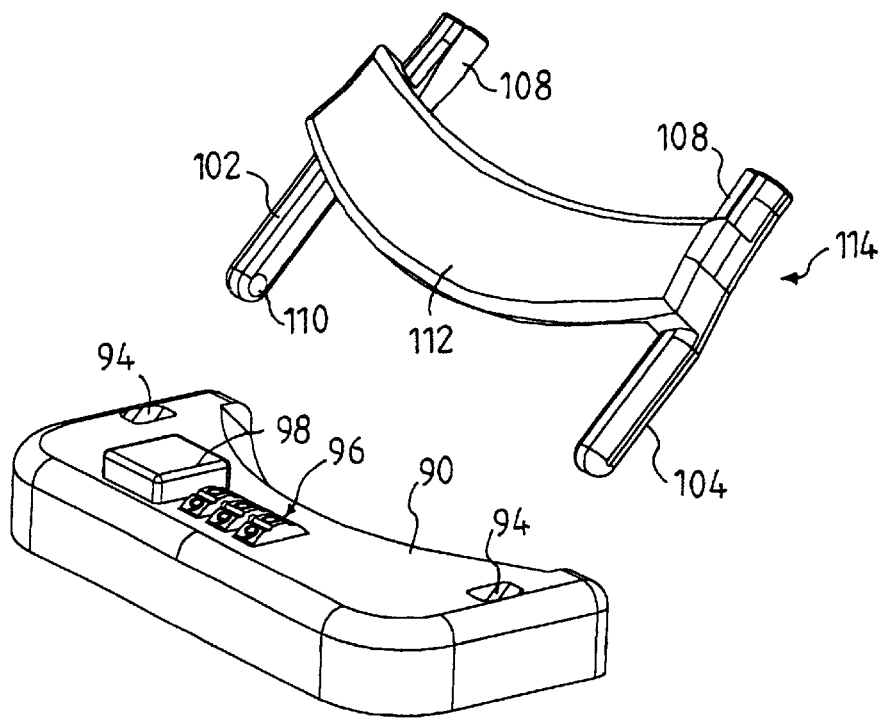
FIG. 42 is a schematic perspective view illustrating a ninth preferred embodiment of the invention, wherein one insertion rod is separated from the housing of the locking apparatus.
Figure 43:
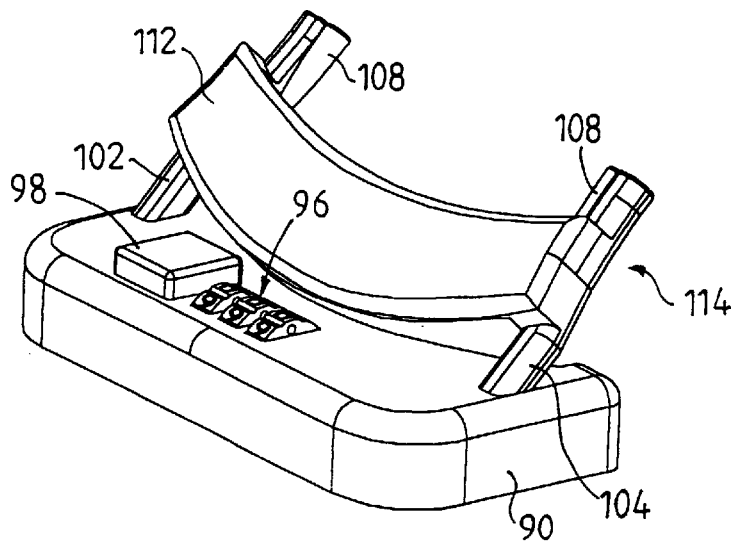
FIG. 43 is a schematic perspective view illustrating the ninth preferred embodiment of the invention, wherein the insertion rod is connected with the housing of the locking apparatus.
Figure 44:
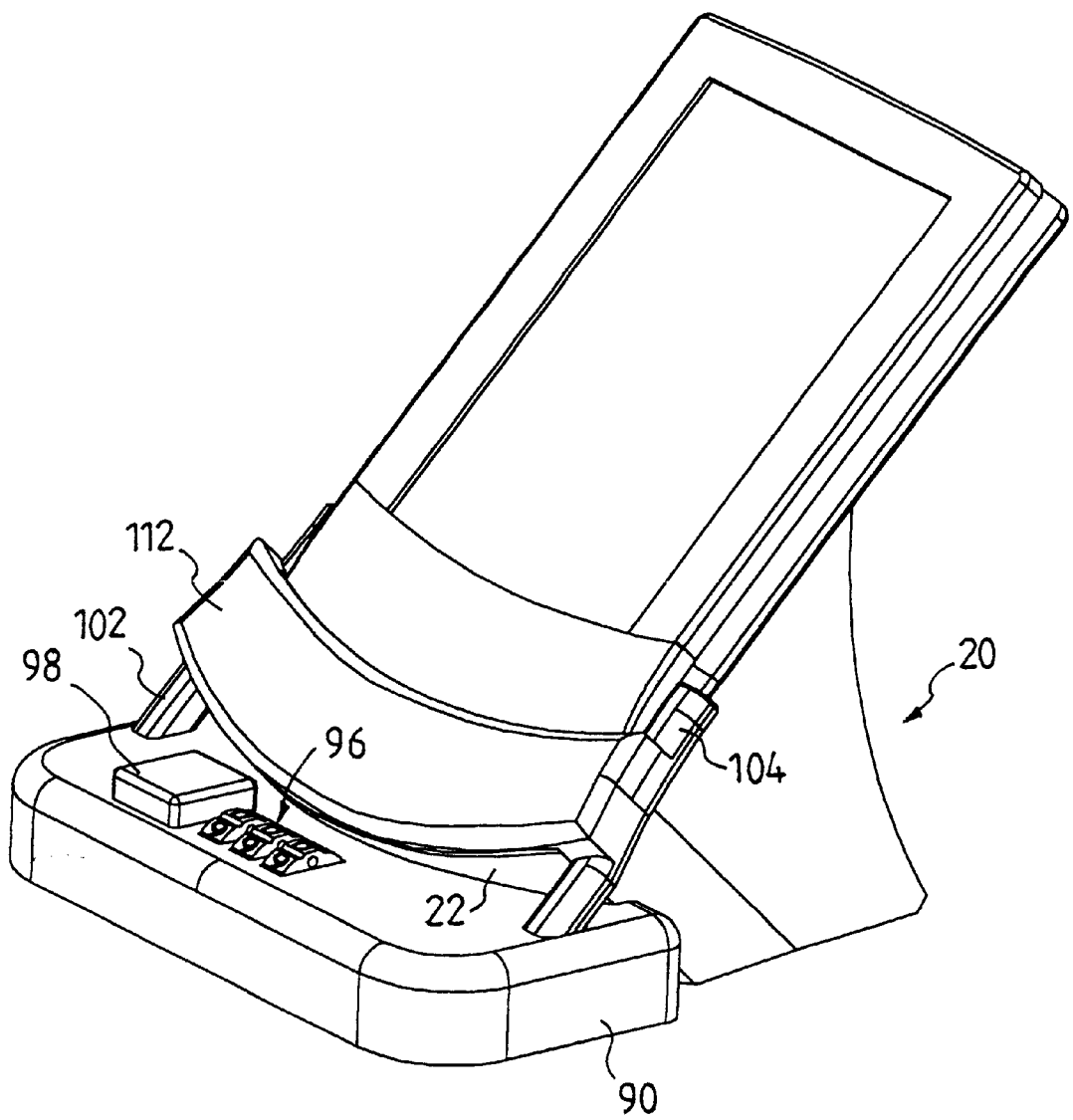
FIG. 44 is a schematic perspective view illustrating the connection of the locking apparatus of the ninth preferred embodiment of the invention with the PDA and the stand.

FIGS. 42 to 44 illustrate a ninth preferred embodiment of the invention. The difference between the eighth and the ninth embodiments resides in that two insertion holes 94 are provided on the housing 90, as can be seen in FIG. 42, and the two insertion rods 102 and 104 are combined by a connecting part 112 to form an insertion assembly 114. Each of the insertion rods 102 and 104 is provided with a protruding post 108 having a tapered free end to be inserted into and slid within the groove 12 of the PDA 10. At least one of the two insertion rods 102 and 104 includes a depression 110. To lock and secure the PDA 10 with the stand 20, the housing 90 is moved to the stand 20 so that the surface 92 of the housing 90 is resisted against the inclined surface 22 of the stand 20. The two protruding posts 108 of the insertion assembly 114 are thereby inserted into the grooves 12 of the PDA 10 and are slid along the grooves 12 such that the tapered free ends of the protruding posts 108 are inserted into the closed ends 16 of the grooves 12, as shown in FIG. 44. The locking mechanism 96 and/or the button 98 can be adjusted subsequently so that the latching member 100, such as that disclosed in the eighth preferred embodiment of FIG. 40, is inserted into the depression 110 of the insertion rod 102 and/or 104 and the insertion assembly 114 is thereby locked. The PDA 10 and the stand 20 are thus locked and secured together.

Figure 45:
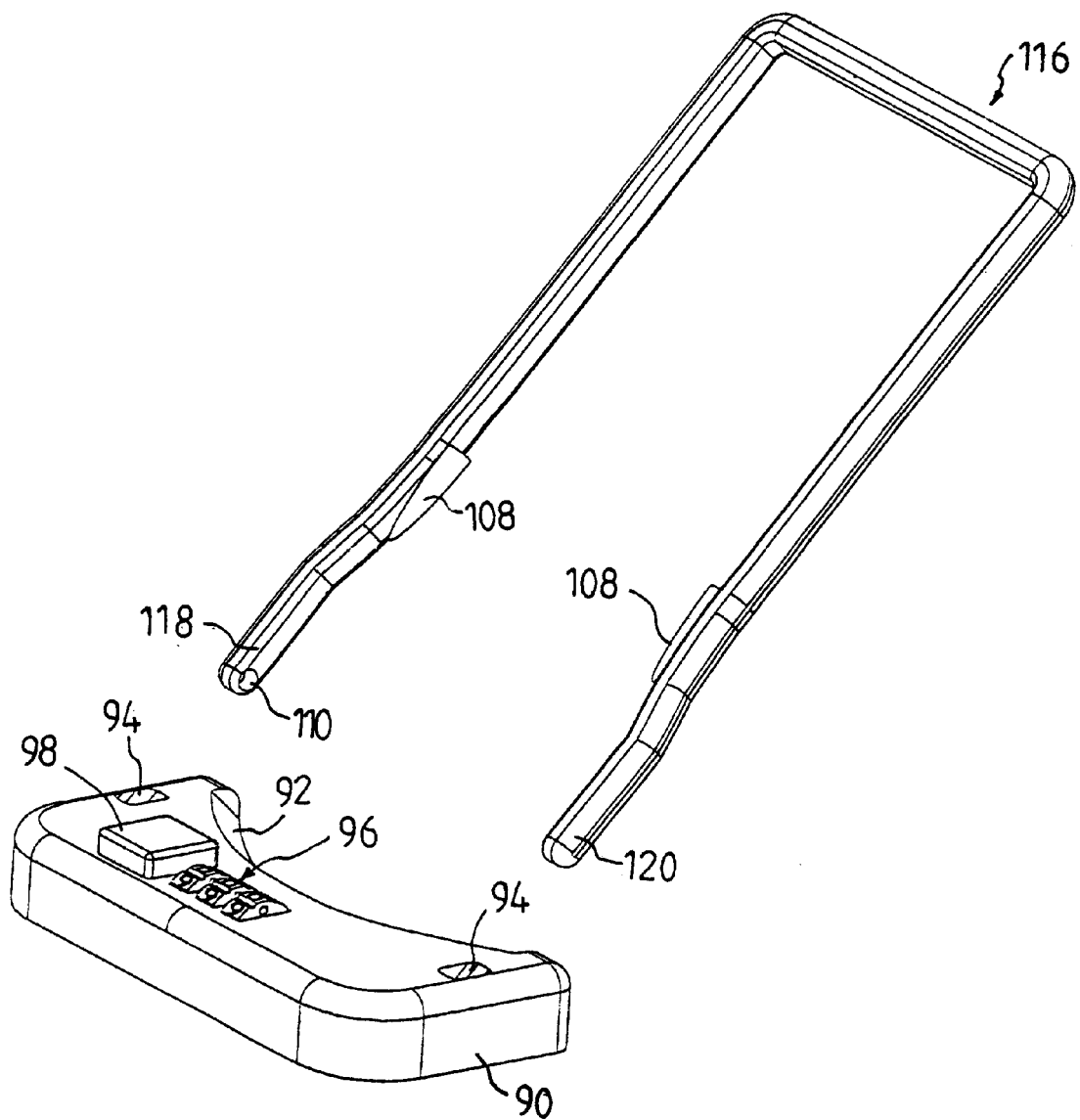
FIG. 45 is a schematic perspective view illustrating a tenth preferred embodiment of the invention, wherein the insertion rod assembly is separated from the housing of the locking apparatus.
Figure 46:
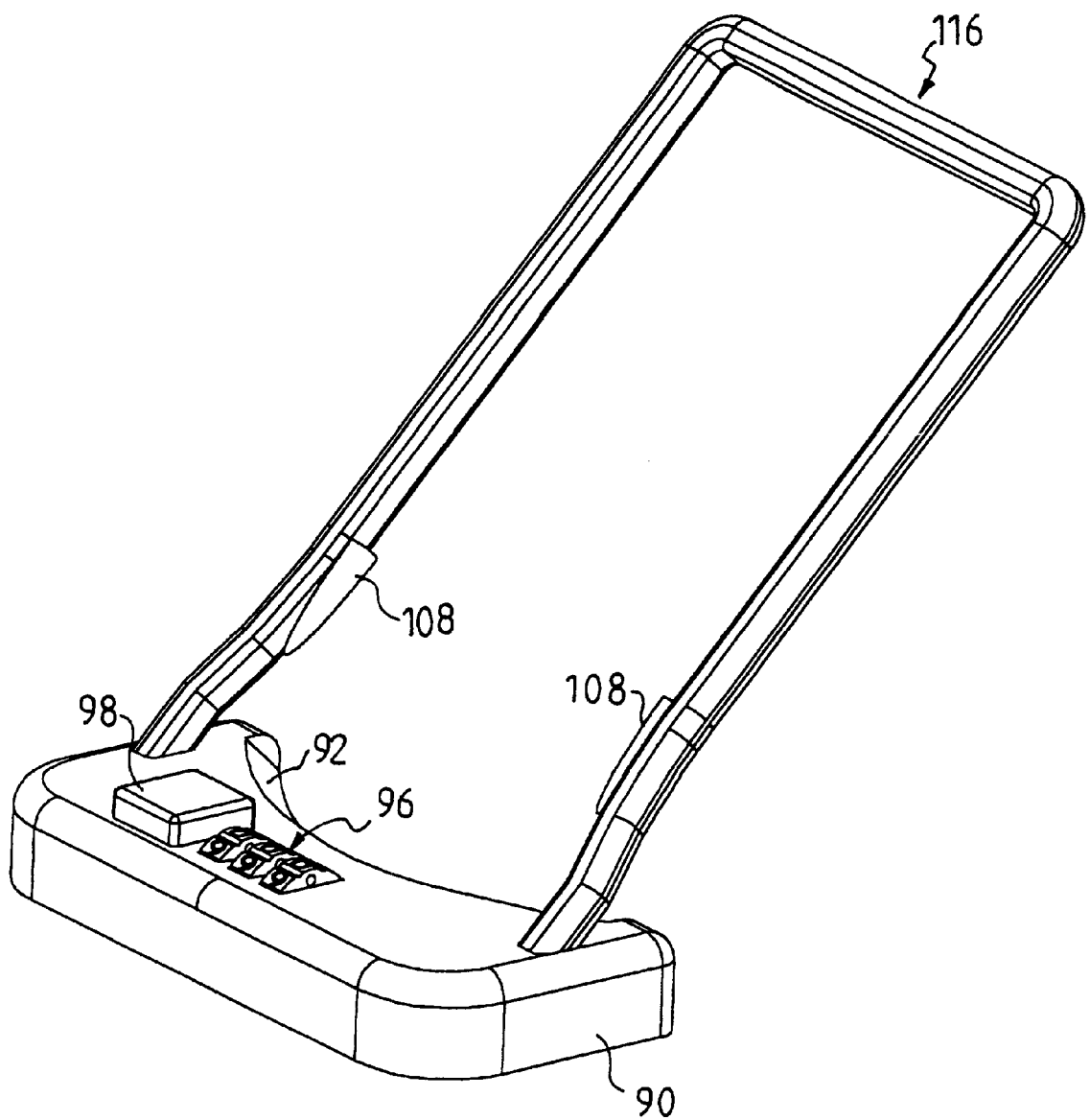
FIG. 46 is a schematic perspective view illustrating the tenth preferred embodiment of the invention, wherein the insertion rod assembly is connected with the housing of the locking apparatus.
Figure 47:
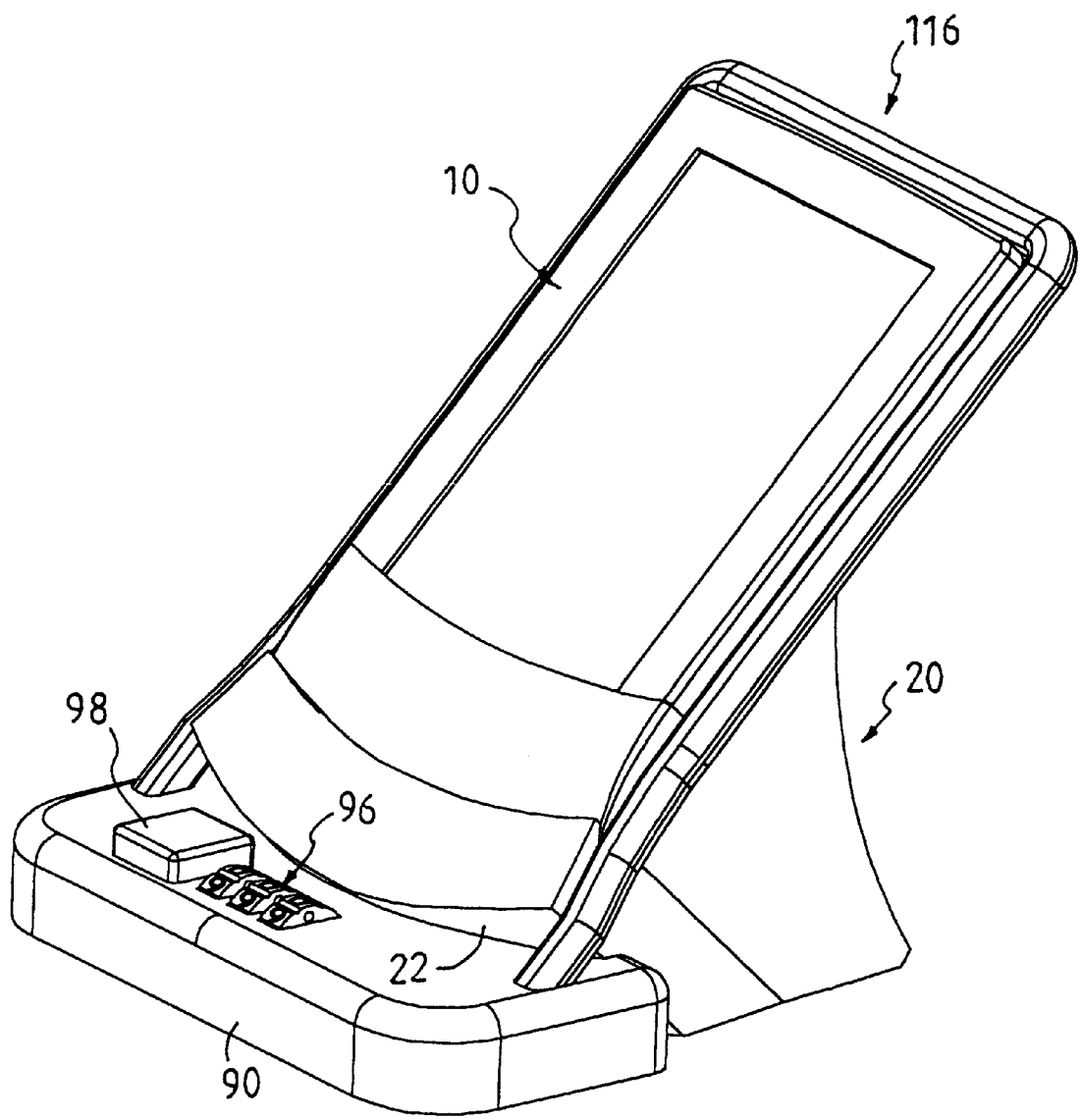
FIG. 47 is a schematic perspective view illustrating the connection of the locking apparatus of the tenth preferred embodiment of the invention with the PDA and the stand.
Figure 48:
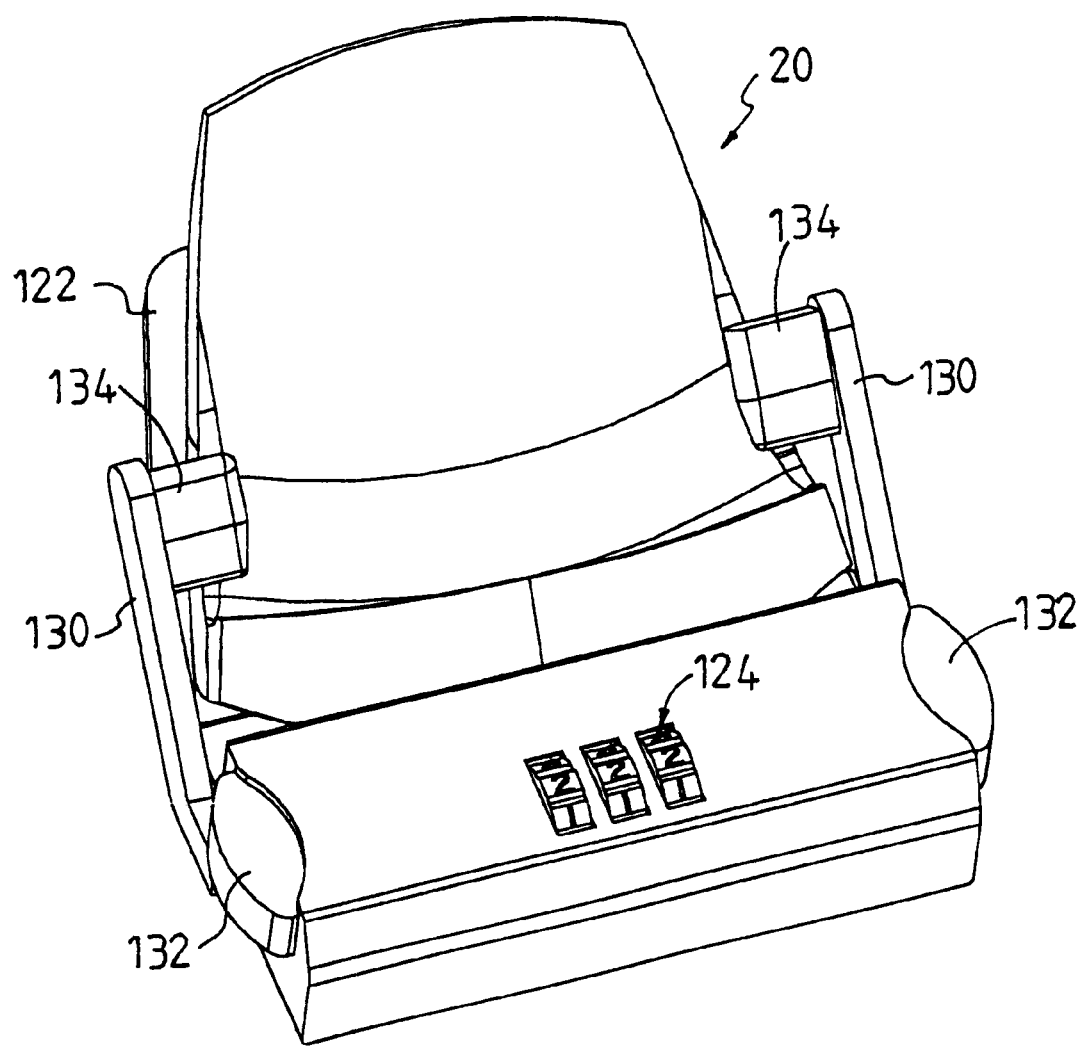
FIG. 48 is a schematic perspective view illustrating an eleventh preferred embodiment of the invention, wherein the PDA has not been placed on the stand and the button of the locking apparatus has not been pressed down.
Figure 49:
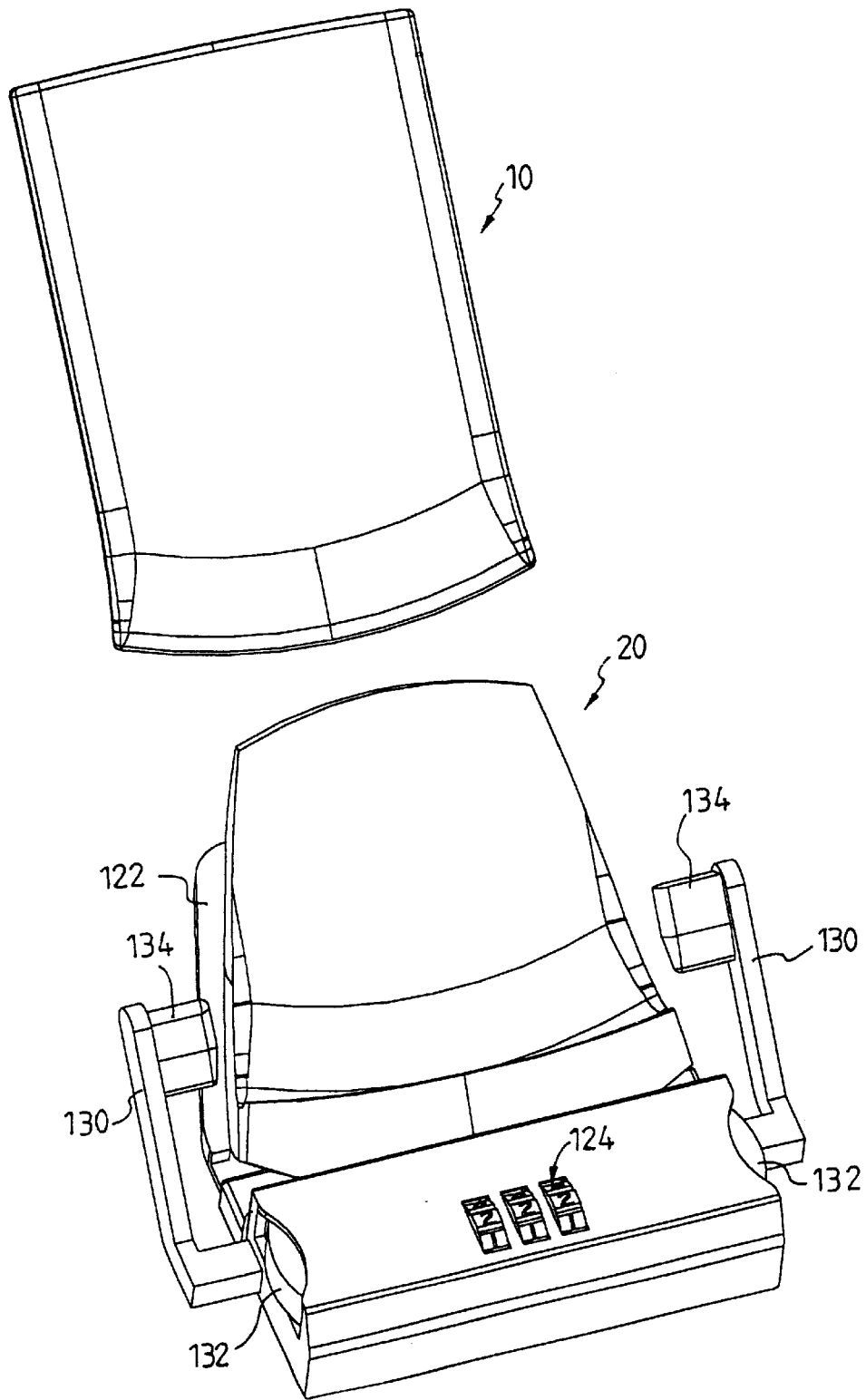
FIG. 49 is a schematic perspective view illustrating the eleventh preferred embodiment of the invention, wherein the PDA has not been placed on the stand but the button of the locking apparatus has been pressed down.
Figure 50:
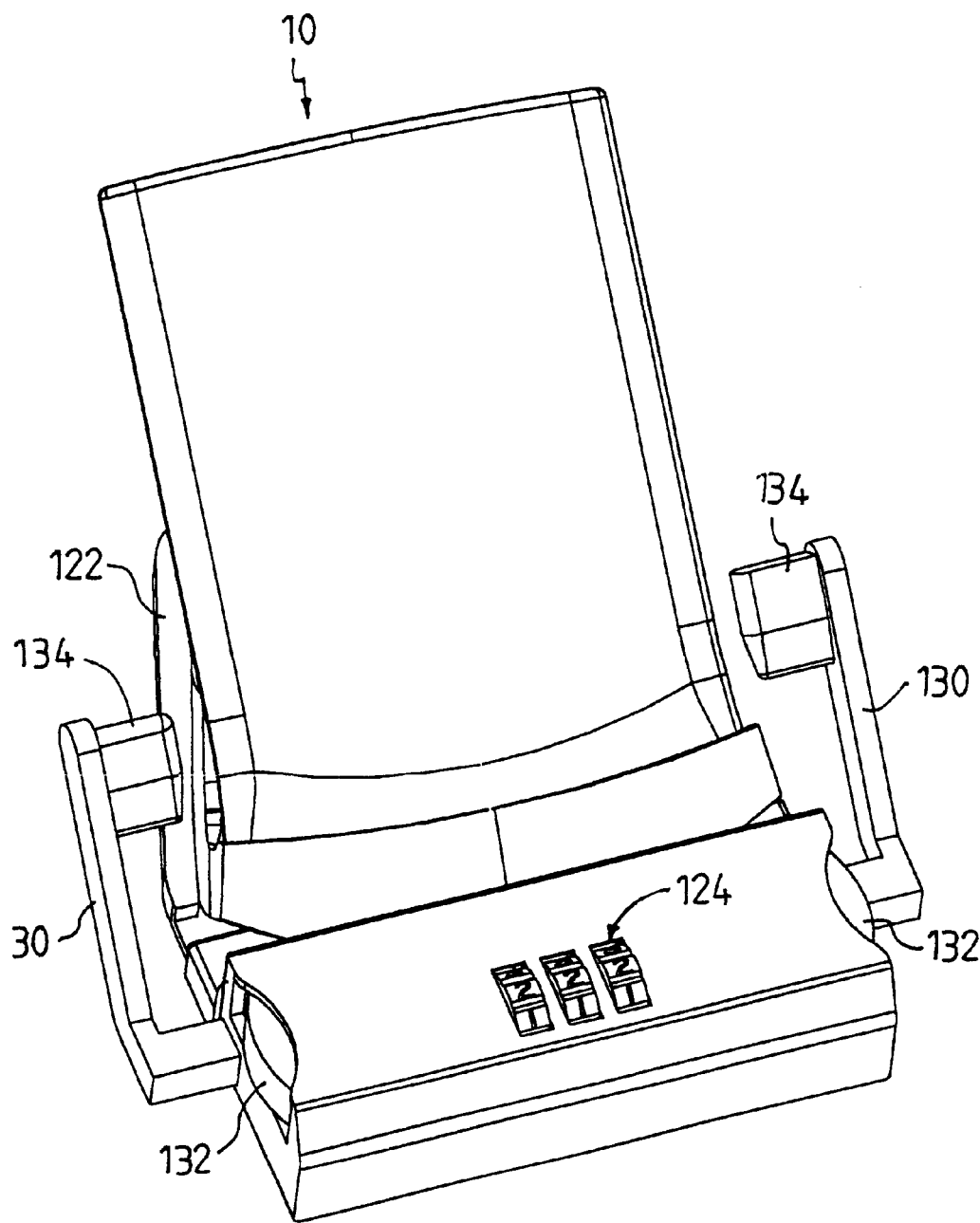
FIG. 50 is a schematic perspective view illustrating the eleventh preferred embodiment of the invention, wherein the PDA has been placed on the stand and the button of the locking apparatus has been pressed down.

FIGS. 45 to 47 illustrate a tenth preferred embodiment of the invention in which an insertion assembly 116 generally in a upside-down U-shape is provided. The insertion assembly 116 has two free ends 118 and 120, at least one of the two free ends (such as the free end 118 shown in FIG. 45) includes a depression 110. The two free ends 118 and 120 of the insertion assembly 116 are separated from each other for a distance of approximately the width of the PDA 10. Each of the free ends 118 and 120 is provided with a protruding post 108 having a tapered free end. To lock and secure the PDA 10 with the stand 20, the two protruding posts 108 are inserted into the grooves 12 of the PDA 10 such that the tapered free ends thereof are inserted into the closed ends 16 of the grooves 12. The free ends 118 and 120 of the insertion assembly 116 are also inserted into the insertion holes 94 of the housing 90. The latching member 100 is inserted into the depression 110 of the insertion assembly 116 which is thereby locked.

Figure 51:
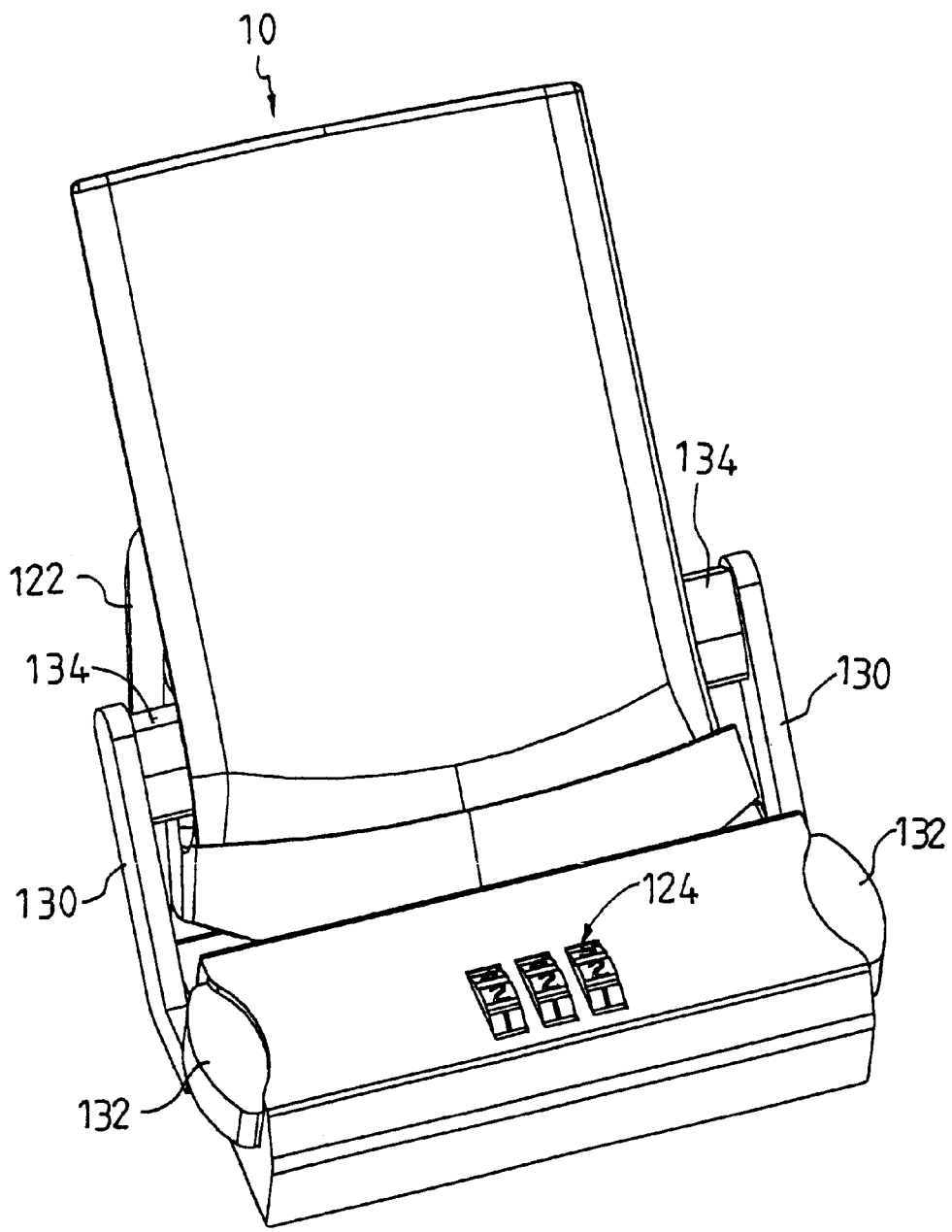
FIG. 51 is a schematic perspective view illustrating the eleventh preferred embodiment of the invention, wherein the PDA is placed on the stand and the button of the locking apparatus is released.
Figure 52:
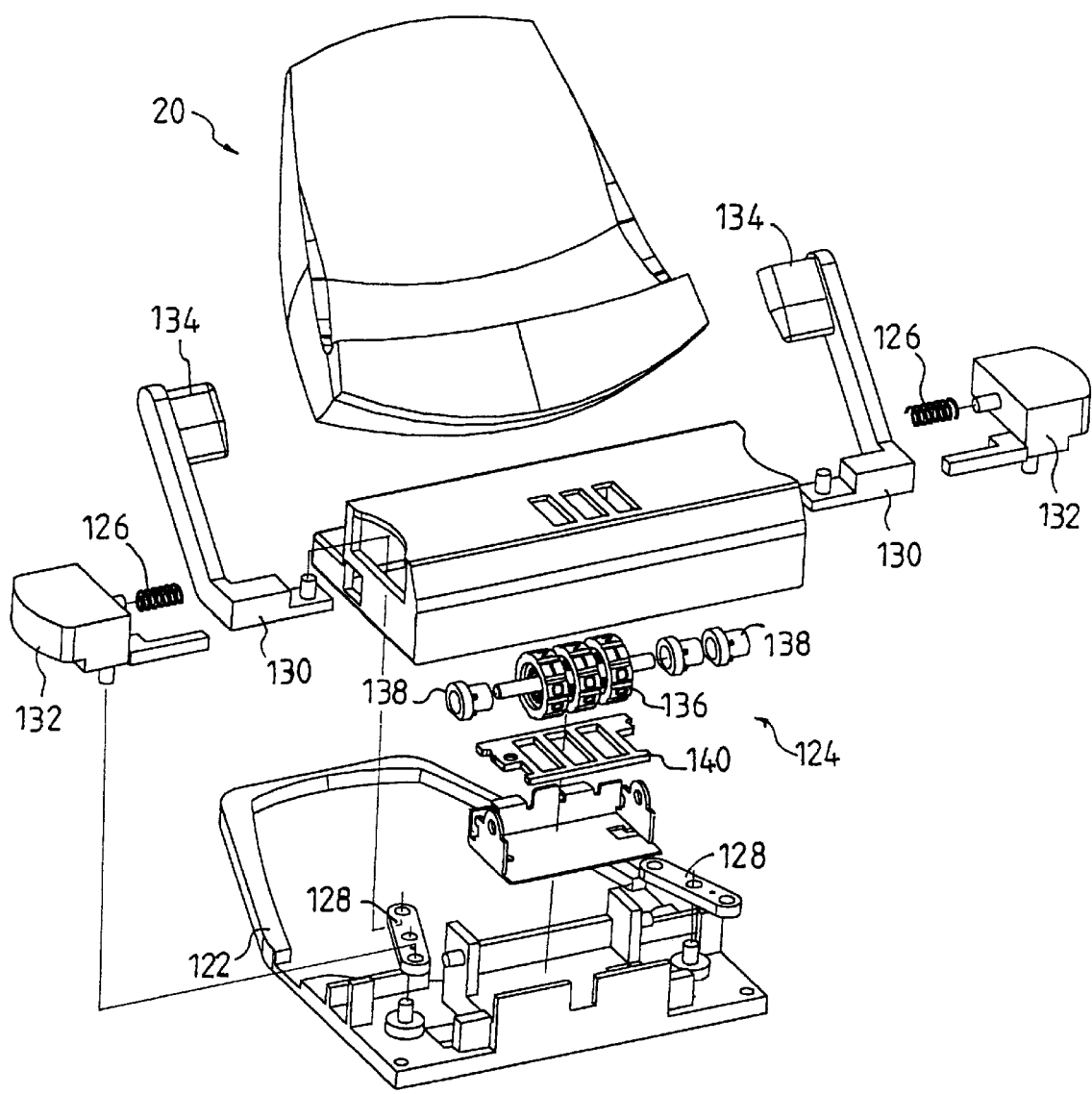
FIG. 52 is an exploded perspective view illustrating the eleventh preferred embodiment of the invention.
Figure 53:
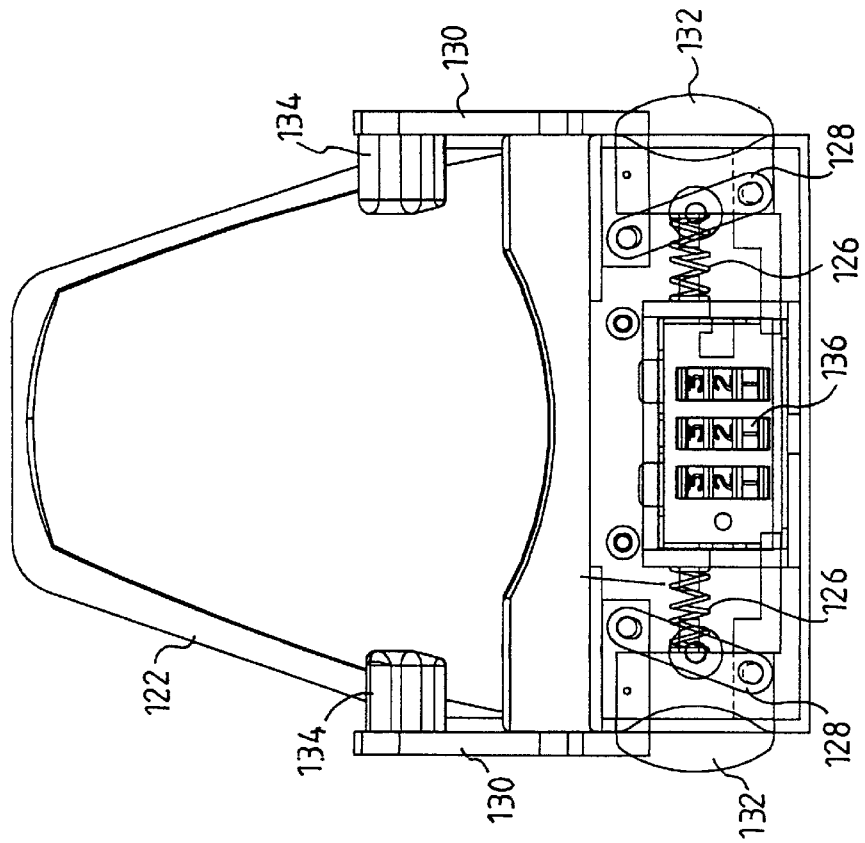
FIG. 53 is a plan view of the eleventh preferred embodiment of the invention illustrating the internal structures of the locking apparatus, wherein the button of the locking apparatus has been pressed down.
Figure 54:
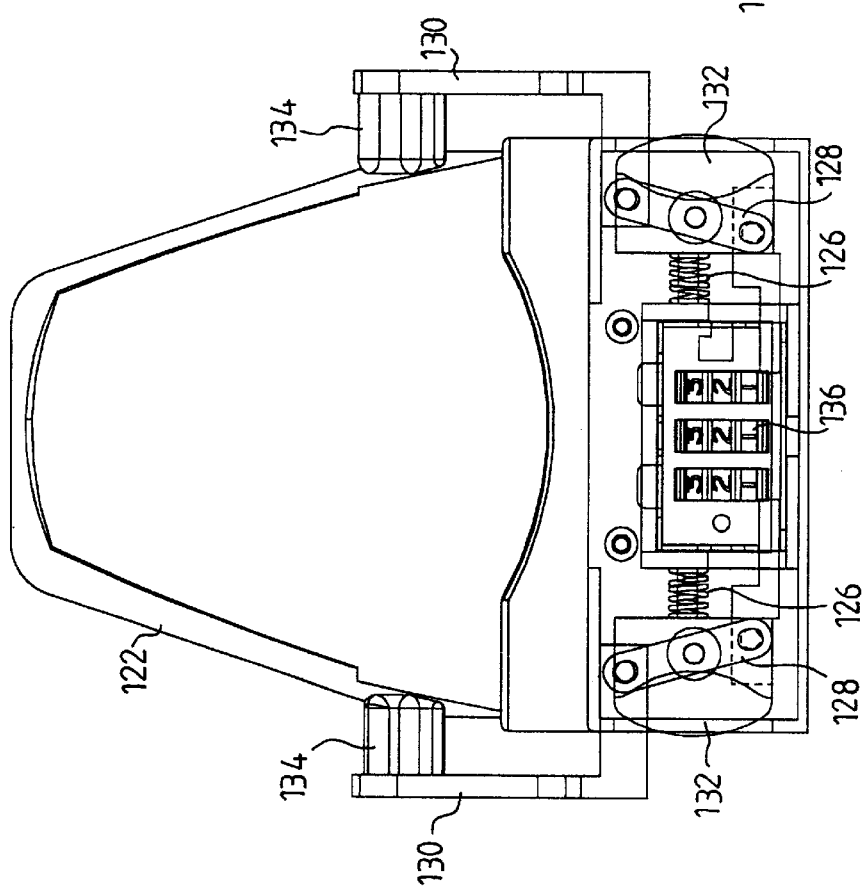
FIG. 54 is a plan view of the eleventh preferred embodiment of the invention illustrating the internal structures of the locking apparatus, wherein the button is released.
Figure 56:
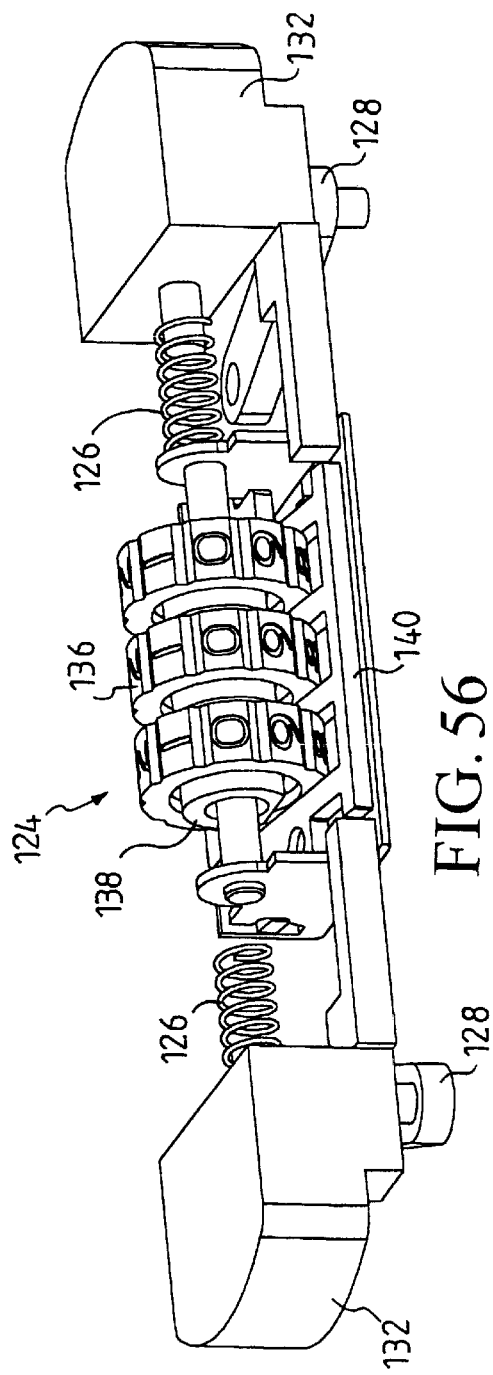
FIG. 56 is a schematic perspective view illustrating fractional structures of the locking apparatus of the eleventh preferred embodiment of the invention.
Figure 55:
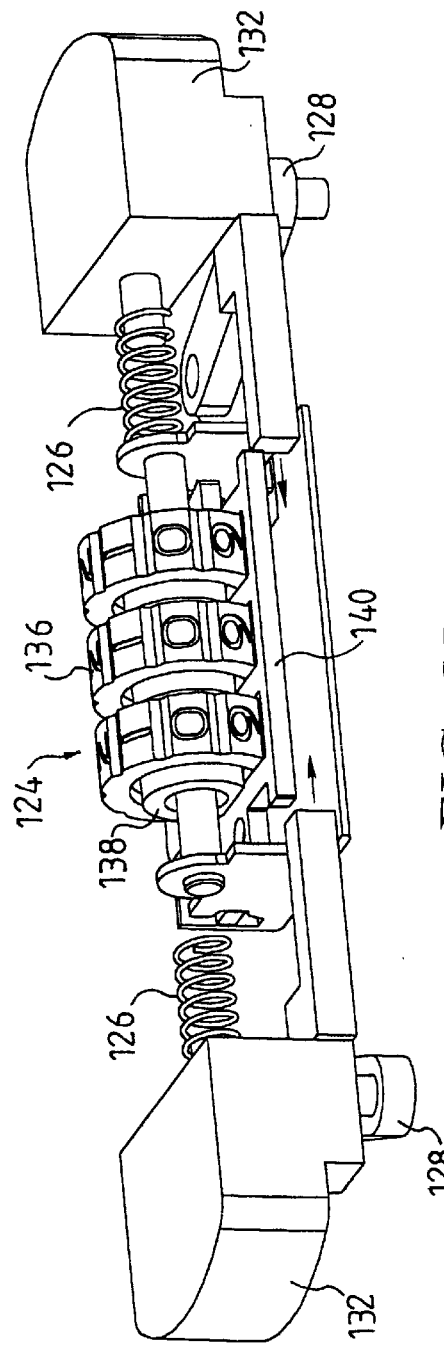
FIG. 55 is a schematic perspective view illustrating fractional structures of the locking apparatus of the eleventh preferred embodiment of the invention.

Referring now to FIGS. 48 to 56 is an eleventh preferred embodiment of the invention comprising a base 122 which can be mounted with the stand 20. The base 122 is used to connect the locking apparatus of the invention with the stand 20 and thus, the base 122 is served as the blocking device in this preferred embodiment. Alternatively, the base 122 and the stand 20 can be integrally formed (not shown in the figures). A locking mechanism 124, with the detailed construction shown in FIG. 52, is mounted on the base 122. Each of the two sides of the locking mechanism 124 is further connected with a spring 126, a pivotal plate 128, an arm 130, and a button 132. The arm 130 has a protruding wedge 134 to be inserted into the groove 12 of the PDA 10, as illustrated in FIG. 51. The locking mechanism 124 includes several number wheels 136 having inner sleeves 138 which can be driven by the number wheels 136 therein. As can be seen in FIGS. 52, 55 and 56, the inner sleeves 138 are connected with a drag plate 140 that can be driven and moved by the inner sleeves 138. When the drag plate 140 is at a horizontal position, as illustrated in FIG. 55, the buttons 132 can be pressed down such that the pivotal plates 128 are rotated so as to push the arms 130 outwardly, as shown in FIG. 53. At this time, the PDA 10 can be placed on the stand 20. When the buttons 132 are released, the resilient force of the springs 126 will impel the buttons 132 to the position prior to being pressed down such that the pivotal plates 128 are rotated reversely and the arms 130 are moved inwardly, as shown in FIG. 54. Accordingly, the protruding wedges 134 of the arms 130 are traverse moved and inserted into the grooves 12 of the PDA 10, as illustrated in FIG. 51. When the number wheels 136 of the locking mechanism 124 are rotated, the inner sleeves 138 are consequently rotated to drive the drag plate 140 downwardly to a position shown in FIG. 56, the buttons 132, thus, cannot be pressed down because the hindrance of the drag plate 140. Accordingly, the arms 130 cannot be open outwardly. Since the protruding wedges 134 of the arms 130 are inserted and stuck within the grooves 12 of the PDA 10, the PDA 10 and the stand 20 are thus locked and secured together.

Figure 58:
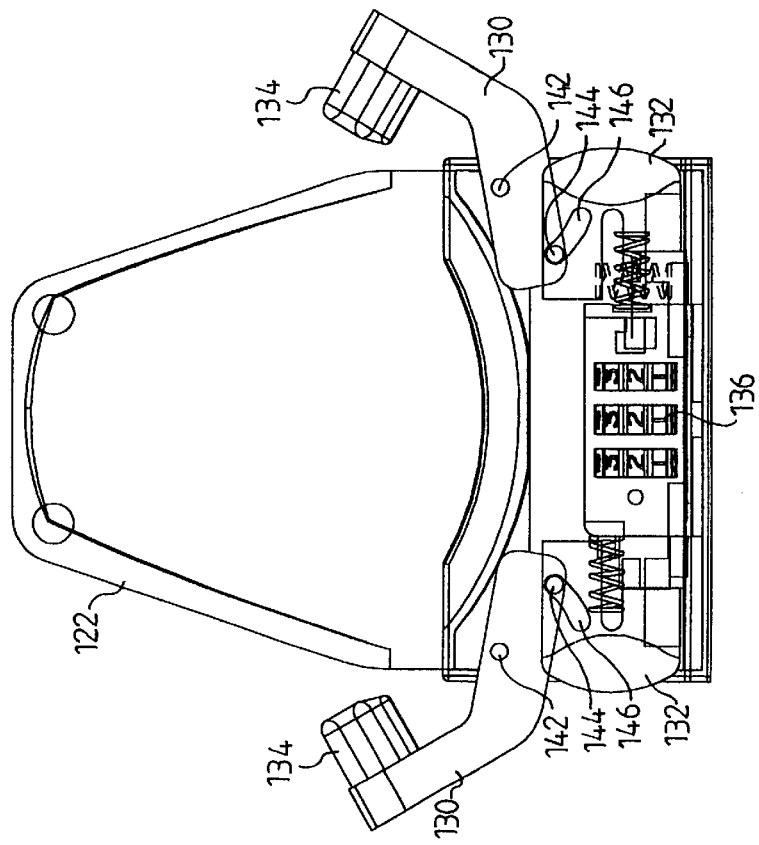
FIG. 58 is a plan view of the twelfth preferred embodiment of the invention illustrating the internal structures of the locking apparatus, wherein the button has been pressed down.
Figure 57:
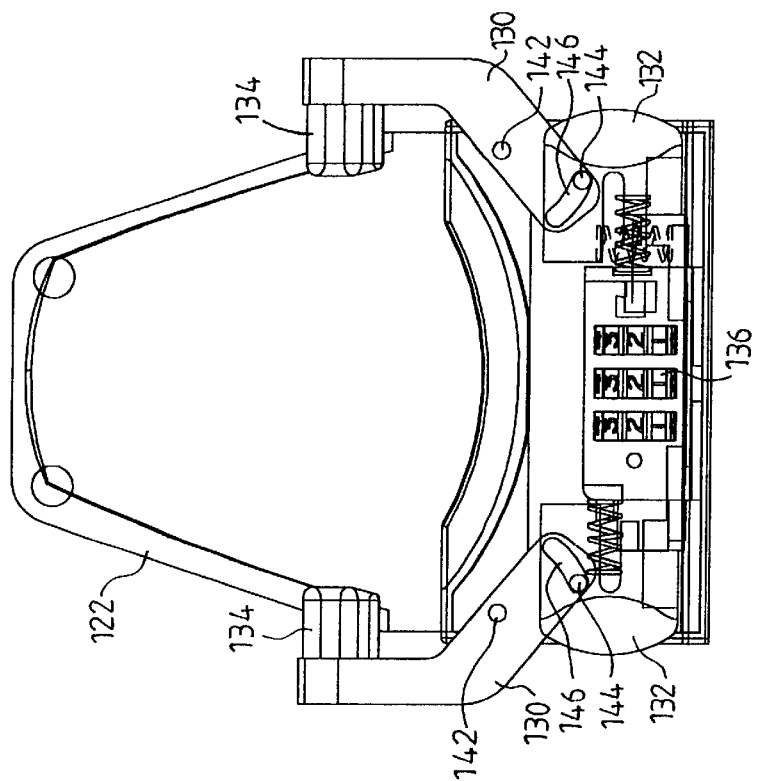
FIG. 57 is a plan view of a twelfth preferred embodiment of the invention illustrating the internal structures of the locking apparatus, wherein the button has not been pressed down.

FIGS. 57 and 58 illustrate a twelfth preferred embodiment of the invention. The difference between the twelfth and the eleventh embodiments resides in the opening measures of the arms 130. In this preferred embodiment, the arms 130 are pivotally connected with the base 122 at positions 142 and are linked with the buttons 132 by pins 144 which are located within arcuate channels 146 of the arms 130. Therefore, when the buttons 132 are pressed down, the pins 144 can only follow the arcuate channels 146 so that the arms 130 are pivotally rotated outwardly with respect to positions 142, as shown in FIG. 58.

This invention is related to a novel device that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

| | |
|---|---|
| 10 | PDA |
| 12 | grooves |
| 20 | stand |
| 22 | inclined surface of stand |
| 30 | locking apparatus |
| 32 | housing |
| 34 | locking mechanism |
| 36 | protruding posts |
| 38 | button |
| 40 | blocks |
| 42 | locking mechanism |
| 44 | locking mechanism |
| 46 | protruding posts |
| 48 | block |
| 50 | housing |
| 52 | bottom surface |
| 54 | rear surface |
| 56 | locking mechanism |
| 58 | arms |
| 60 | protruding posts |
| 62 | locking mechanism |
| 64 | protruding wedge |
| 66 | free end portion |
| 68 | main body |
| 70 | protruding wedge |
| 72 | pivotal joint |
| 74 | protruding post |
| 76 | locking mechanism |
| 78 | pivotal joints |
| 80 | free and portion |
| 82 | main body |

-continued

| | |
|---|---|
| 84 | connecting part |
| 86 | protruding post |
| 88 | protruding post |
| 90 | housing |
| 92 | surface of housing |
| 94 | insertion hole |
| 96 | locking mechanism |
| 98 | button |
| 100 | latching member |
| 102 | insertion rod |
| 104 | insertion rod |
| 106 | protruding wedge |
| 108 | protruding post |
| 110 | depression |
| 112 | connecting part |
| 114 | insertion assembly |
| 116 | insertion assembly |
| 118 | free end |
| 120 | free end |
| 122 | base |
| 124 | locking mechanism |
| 126 | springs |
| 128 | pivotal plates |
| 130 | arms |
| 132 | buttons |
| 134 | protruding wedges |
| 136 | number wheels |
| 138 | inner sleeves |
| 140 | drag plate |
| 142 | position where arm is pivotally connected with the base |
| 144 | pins |
| 146 | arcuate channels |

What is claimed is:

1. A locking apparatus for securing a compact computer on a stand, in which the compact computer has at least one longitudinal extended groove formed thereon, and the groove has an upper end and a lower end of which the upper end is formed with an opening and the lower end is configured to a closed end; the stand has an inclined surface upwardly extending from a front bottom side thereof, the locking apparatus comprises:
    a locking mechanism;
    at least one protrusion which is connected with the locking mechanism and adapted to be correspondingly inserted into the at least one groove of the compact computer; and
    a blocking device which is connected with the locking mechanism and is convertible between a locking position and an unlocking position;
    whereby when the blocking device is at the locking position, where the locking mechanism is engaged with the blocking device, the blocking device resists against the inclined surface of the stand; and when the blocking device is at the unlocking position, where the locking mechanism is disengaged from the blocking device, the blocking device is movable away from the stand.

2. The locking apparatus according to claim 1, wherein the closed end of the groove of the compact computer is gradually tapered.

3. The locking apparatus according to claim 2, wherein the blocking device is pivotally connected with the locking mechanism; the at least one protrusion has a tapered free end; when the tapered free end of the protrusion is inserted into the closed end of the groove, the blocking device is adapted to pivotally rotate to the locking position thereof to resist against the inclined surface of the stand and the locking mechanism is adapted to be engaged for the blocking device at the locking position.

4. The locking apparatus according to claim 3, wherein the compact computer has two longitudinal grooves respectively formed on two opposing sides thereof, and the locking apparatus has two protrusions respectively disposed on two opposing sides thereof for being received in the longitudinal grooves; when the tapered free ends of the two protrusions are inserted into the closed ends of the two grooves, respectively, the blocking device is adapted to pivotally rotate to the locking position to resist against the inclined surface of the stand for the locking mechanism to engage the blocking device at the locking position.

5. The locking apparatus according to claim 2, wherein the compact computer has two opposing sides and two longitudinal extended grooves formed on the two sides thereof, respectively, wherein the blocking device is a housing, which has two sides, and the locking apparatus further comprises two arms mounted on and adapted to pivotally rotate with respect to the two sides of the housing, and wherein the locking apparatus comprises two protrusions each having a tapered free end and provided on the two arms, respectively; when the tapered free ends of the two protrusions are inserted into the closed ends of the two grooves, the housing is adapted to pivotally rotate to the locking position to resist against the inclined surface for the locking mechanism to engage the housing at the locking position.

6. The locking apparatus according to claim 1, wherein the compact computer has two opposing sides and two longitudinal extended grooves formed on the two sides thereof, respectively, wherein the locking apparatus comprises two protrusions, the blocking device is a rod including a curved free end portion and a body portion, the body portion is pivotally connected with the locking mechanism, and wherein one of the protrusions is mounted on the locking mechanism, and the other protrusion is provided on the free end portion of the rod, thereby the two protrusions are adapted to be inserted into the two grooves so that the body portion of the rod resists against the inclined surface of the stand for the locking mechanism to engage the rod at the locking position without rotating about the body portion thereof.

7. The locking apparatus according to claim 6, wherein the closed end of each of the grooves of the compact computer is tapered, the rod has a pivotal joint provided between the curved free end portion and the body portion thereof, the protrusion provided on the free end portion is a protruding post having a tapered free end.

8. The locking apparatus according to claim 2, wherein the compact computer has two opposing sides and two longitudinal extended grooves formed on the two sides thereof, wherein the blocking device is a rod having two pivotal joints, and a free end portion, a body portion and a portion connected with the locking mechanism which are jointed by the two pivotal joints, the portion connected with the locking mechanism is adapted to telescopically move between the unlocking position and the locking position, the free end portion and the portion connected with the locking mechanism, respectively, is adapted to pivotally rotate with respect to the body portion by the two pivotal joints, wherein the locking apparatus comprises two protrusions, one of the protrusions is provided on the locking mechanism and the other protrusion is provided on the free end portion, each of the two protrusions is a protruding post with a tapered free end which is adapted to be inserted into the two grooves; when the tapered free ends of the two protruding posts are inserted into the closed ends of the two grooves, the body portion of the rod resists against the inclined surface of the stand for the locking mechanism to engage the rod at the locking position.

9. A locking apparatus for securing a compact computer on a stand, in which the compact computer has at least one longitudinal extended groove formed thereon, and the groove has an upper end and a lower end of which the upper end is formed with an opening and the lower end is configured to a tapered closed end; the stand has an inclined surface upwardly extending from a front bottom side thereof, the locking apparatus comprises:

- a housing having a surface configured complementary to the inclined surface of the stand and the housing is adapted to closely resist against the inclined surface of the stand, the housing has at least one-insertion hole;
- a locking mechanism provided within the housing;
- a latching member which is connected with and controlled by the locking mechanism and is convertible between an unlocking position and a locking position; and
- at least one insertion rod having a protrusion thereon, the protrusion is adapted to be correspondingly inserted into the at least one groove of the compact computer, a cavity is provided on the insertion rod, the insertion rod is adapted to be inserted into the insertion hole of the housing, and the latching member is adapted to be inserted into the cavity of the insertion rod at the locking position.

10. The locking apparatus according to claim 9, wherein the compact computer has two opposing sides and two longitudinal extended grooves formed on the two sides thereof, respectively, wherein the locking apparatus has an insertion assembly including a connecting part having two sides and two insertion rods mounted on the two sides of the connecting part, respectively, each of the insertion rods is provided with a protrusion which is a protruding post with a tapered free end.

11. The locking apparatus according to claim 9, wherein the compact computer has two opposing sides and two longitudinal extended grooves formed on the two sides thereof, respectively, the insertion rod is in a shape of reversed U and has two free ends with two protrusions disposed thereon, respectively, each of the two protrusions is a protruding post with a tapered free end.

12. A locking apparatus for securing a compact computer on a stand, in which the compact computer has at least one longitudinal extended groove formed thereon, the locking apparatus comprises:

- a base for the stand to be mounted thereon;
- a locking mechanism connected with the base; and
- at least one blocking device connected with the locking mechanism, the at least one blocking device is connected with and controlled by the locking mechanism and is convertible between an unlocking position and a locking position; whereby the blocking device is at the locking position where the locking mechanism is engaged, thereby the blocking device is adapted to be inserted into the at least one groove of the compact computer at the locking position.

13. The locking apparatus according to claim 12, wherein the base of the locking apparatus is integrally formed with the stand.

14. The locking apparatus according to claim 12, wherein the compact computer and the locking mechanism respectively has two sides, and the compact computer has two longitudinal extended grooves respectively formed on the two sides thereof, the at least one blocking device comprises two arms which are mounted on the two sides of the locking apparatus, each of the two arms is provided with a protrusion which is adapted to be inserted into the grooves.

* * * * *